(12) United States Patent  
Mintz et al.

(10) Patent No.: US 8,781,946 B2  
(45) Date of Patent: Jul. 15, 2014

(54) DISTRIBUTED SERVER SIDE DEVICE ARCHITECTURE

(75) Inventors: Sagy Pundak Mintz, Lincolnshire, IL (US); Michael J. Burns, Riverside, IL (US)

(73) Assignee: Trading Technologies International, Inc., Chicago, IL (US)

( * ) Notice: Subject to any disclaimer, the term of this patent is extended or adjusted under 35 U.S.C. 154(b) by 563 days.

(21) Appl. No.: 12/836,490

(22) Filed: Jul. 14, 2010

(65) Prior Publication Data

US 2012/0016786 A1  Jan. 19, 2012

(51) Int. Cl.
G06Q 40/00 (2012.01)
G06Q 40/04 (2012.01)
G06Q 40/06 (2012.01)

(52) U.S. Cl.
CPC ............... *G06Q 40/04* (2013.01); *G06Q 40/06* (2013.01)
USPC .......................................................... 705/37

(58) Field of Classification Search
CPC ............................... G06Q 40/04; G06Q 40/06
USPC .......................................................... 705/37
See application file for complete search history.

(56) References Cited

U.S. PATENT DOCUMENTS

| | | | |
|---|---|---|---|
| 7,171,386 B1* | 1/2007 | Raykhman | 705/37 |
| 7,747,508 B1* | 6/2010 | Silverman | 705/37 |
| 7,788,167 B1* | 8/2010 | Deitz et al. | 705/37 |
| 2005/0160024 A1* | 7/2005 | Soderborg et al. | 705/37 |
| 2006/0129473 A1* | 6/2006 | Hansen et al. | 705/37 |
| 2006/0265322 A1* | 11/2006 | Burns | 705/37 |
| 2007/0038548 A1* | 2/2007 | Schlifstein et al. | 705/37 |
| 2007/0118457 A1* | 5/2007 | Peterffy et al. | 705/37 |
| 2008/0243709 A1* | 10/2008 | Mintz et al. | 705/36 R |
| 2009/0089202 A1* | 4/2009 | Rowley | 705/37 |
| 2009/0210337 A1* | 8/2009 | Mahoney et al. | 705/37 |
| 2009/0276365 A1* | 11/2009 | Wilson | 705/36 R |
| 2009/0299890 A1* | 12/2009 | Kontos et al. | 705/37 |

(Continued)

OTHER PUBLICATIONS

Mehta, N., "Dark Pools Eye Retail Flow," Traders, Apr. 1, 2008.*

(Continued)

*Primary Examiner* — Kirsten Apple
*Assistant Examiner* — Joan Goodbody
(74) *Attorney, Agent, or Firm* — McDonnell Boehnen Hulbert & Berghoff LLP

(57) ABSTRACT

An electronic trading method is provided. The method includes receiving a trading strategy order having a parent trading strategy including multiple quoting legs; splitting the trading strategy order into multiple child orders; and submitting each of the multiple child orders to exchange systems adapted to fill the quoting legs in the child orders. Each child order includes a child trading strategy having a single quoting leg or a reduced number of quoting legs relative to the parent trading strategy. The child trading strategies are the same as the parent trading strategy except for the number of legs marked as quoting legs. The method may be performed by a trading strategy device disposed between a client device and multiple server side devices.

17 Claims, 12 Drawing Sheets

(56) References Cited

U.S. PATENT DOCUMENTS

| | | | |
|---|---|---|---|
| 2010/0017323 A1* | 1/2010 | Zimmerman | 705/37 |
| 2010/0036766 A1 | 2/2010 | Burns | |
| 2010/0094746 A1* | 4/2010 | MacGregor et al. | 705/37 |
| 2010/0121757 A1 | 5/2010 | McNicholas | |
| 2010/0145874 A1* | 6/2010 | Janowski | 705/36 R |
| 2010/0293109 A1* | 11/2010 | Jain et al. | 705/36 R |
| 2010/0332367 A1* | 12/2010 | Foygel et al. | 705/37 |
| 2011/0066568 A1 | 3/2011 | Milne et al. | |
| 2011/0078064 A1* | 3/2011 | Messina et al. | 705/37 |
| 2011/0145124 A1* | 6/2011 | Rooney | 705/37 |
| 2011/0145165 A1* | 6/2011 | Haldes et al. | 705/36 R |
| 2011/0313905 A1* | 12/2011 | Siddall et al. | 705/37 |
| 2012/0016784 A1* | 1/2012 | Mintz et al. | 705/37 |

OTHER PUBLICATIONS

"Morgan Stanley with Andrew Silverman at Thomson Reuters Exchanges and Trading Summit (New York)," Anonymous, Fair Disclosure Wire, May 5, 2008.*

International Search Report and Written Opinion of International Application No. PCT/US2011/043353, dated Sep. 30, 2011 (mailed Oct. 20, 2011).

* cited by examiner

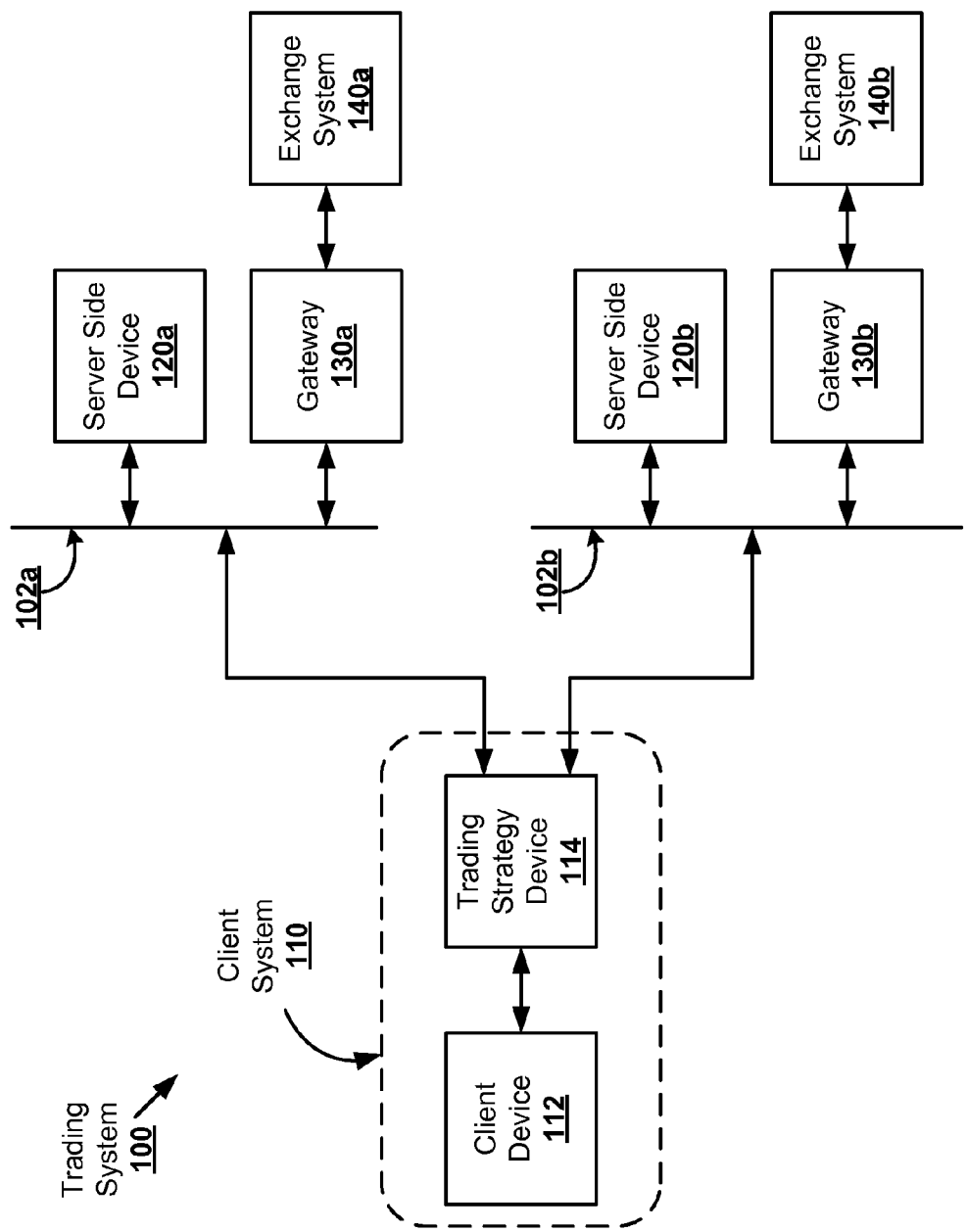

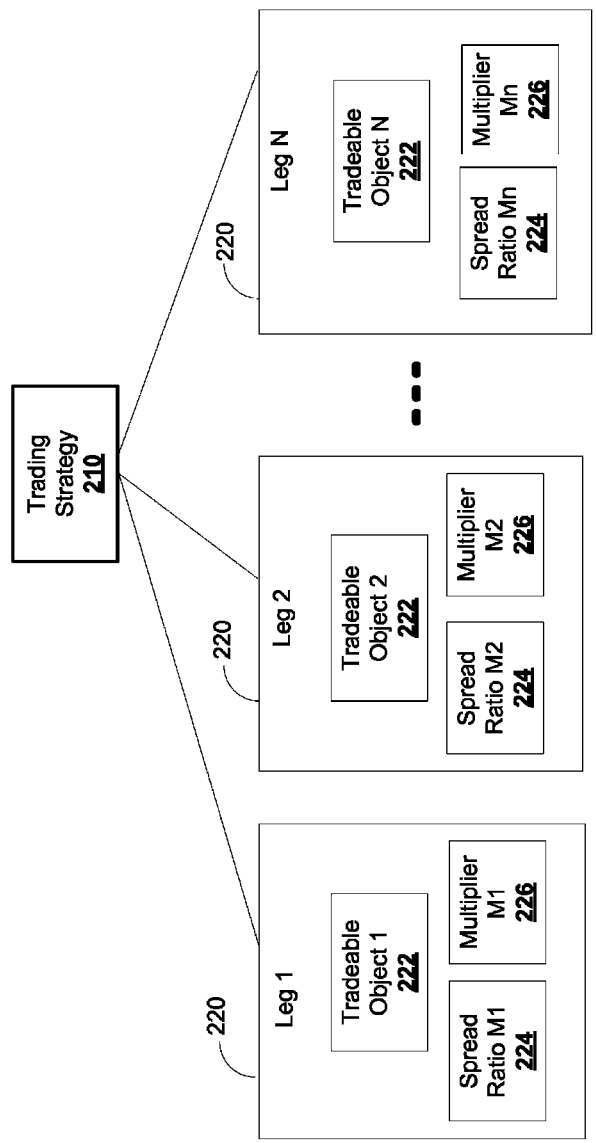

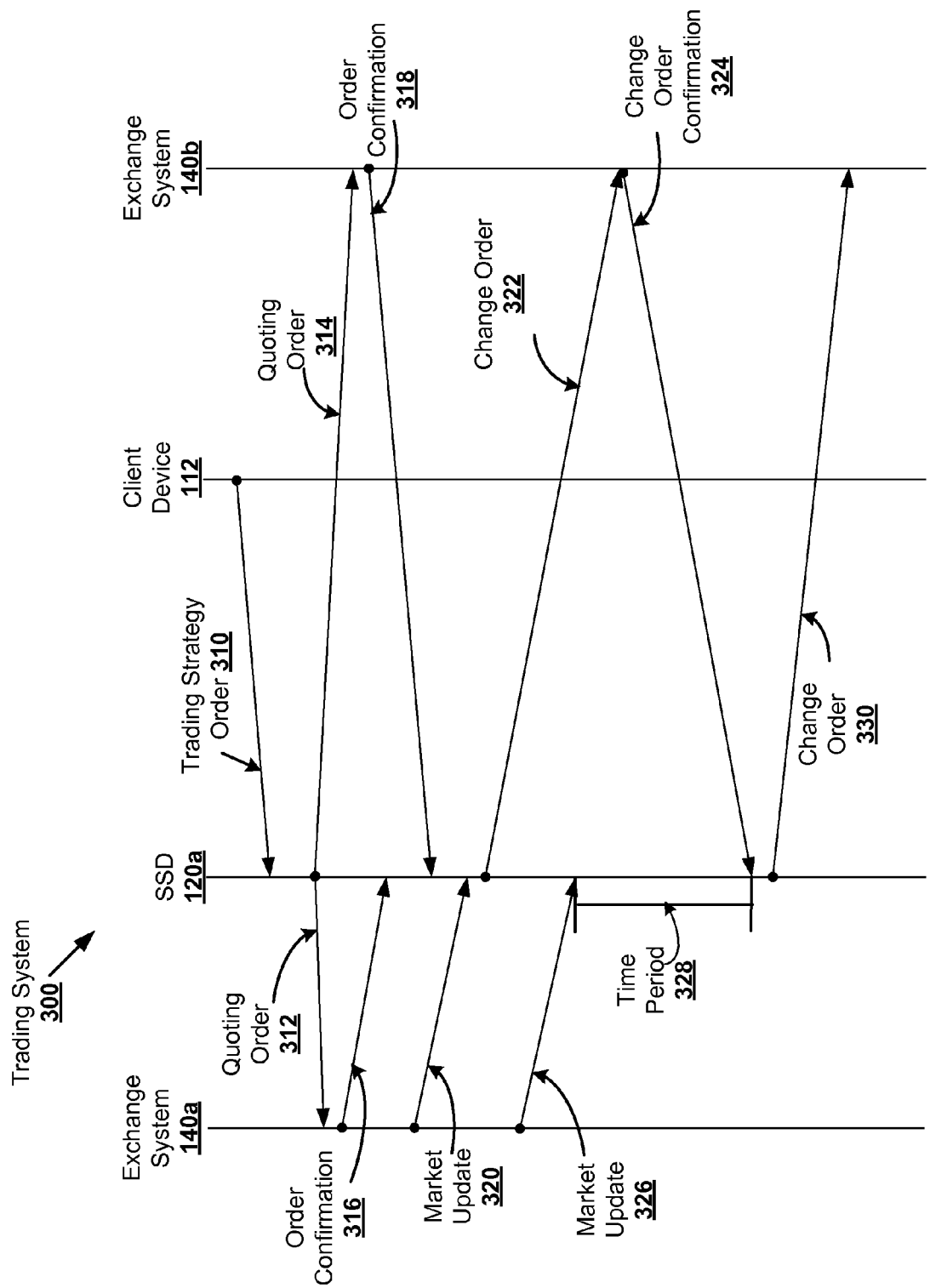

DISTRIBUTED SERVER SIDE DEVICE ARCHITECTURE

FIELD

The present patent document relates to electronic trading. In particular, the present patent document relates to trading or exchanging tradable objects, such as securities or commodities, within an organized electronic trading system.

BACKGROUND

An electronic trading system ("trading system") may be used to electronically buy and sell tradable objects. A tradable object is simply anything that can be traded. For example, a tradable object may be, but is not limited to, all types of traded products, such as, for example, stocks, options, bonds, futures, currency, contracts, warrants, funds, and commodities, as well as derivatives and collections of the foregoing.

Typically, a trading system includes an electronic exchange system. During the electronic trading process, a user (e.g., a trader using a trading device) submits a trade order for a tradable object to an electronic exchange. The electronic exchange performs order matching, such that the trade order (or a portion of the trade order) is matched with one or more contra-side trade orders. For instance, a sell order is contra-side to a buy order with the same price. Similarly, a buy order is contra-side to a sell order with the same price. Unmatched trade orders are held in the exchange order book until a trade order is matched or removed from the order book.

In addition to matching trade orders, the electronic exchange is typically adapted to provide market data and trade confirmation data to subscribing trading devices. The market data may include information regarding the inside market, market depth, and previous or pending trades for a tradable object. The inside market is the lowest sell price in the market and the highest buy price in the market at a particular point in time. Market depth refers to the number of trade orders that have been placed for a tradable object at a particular price.

SUMMARY

The inventions described herein include, but are not limited to, various devices, systems, methods, and computer program products. Only a few, of the many, inventions are summarized in this section.

In an exemplary electronic trading system, a trading strategy device is disposed between a client device and the multiple (for example, two or more) server side devices, such that the trading strategy device is in communication with the client device and the multiple server side devices. Each server side device is adapted for working orders with one or more electronic exchange systems. Working an order may include, but is not limited to, generating a order, submitting an order, re-quoting an order, cancelling an order, sending an order, managing an order, or any combination thereof.

During operation, the trading strategy device receives one or more trading strategy orders from the client device. A trading strategy order defines, for example, one or more aspects of an instruction to buy or sell a trading strategy. By way of example, a trade order, such as a trading strategy order, may include, but does not have to include, configuration data, price data, quantity data, or any combination thereof. Configuration data is, for example, data that defines a tradable object or trading strategy to be traded, the type of action to be performed (e.g., buy or sell), or other configuration data. A tradable object is simply anything that can be traded. For example, a tradable object may be, but is not limited to, all types of traded products, such as, for example, stocks, options, bonds, futures, currency, contracts, warrants, funds, and commodities, as well as derivatives and collections of the foregoing. A trading strategy defines, for example, a relationship between two or more tradable objects to be traded. Price data, for example, defines a price or value for the tradable object or trading strategy to be traded. Quantity data, for example, defines a number or quantity of a unit of a tradable object or trading strategy to be traded. For example, quantity data may define the number of contracts to be bought or sold.

Once a trading strategy order has been received, the trading strategy device processes the data and identifies whether the trading strategy has multiple quoting legs. In the event that the trading strategy has multiple quoting legs, the trading strategy device generates and transmits multiple trading strategy child orders ("child orders") to the one or more server side devices. Each child order is associated with a child trading strategy with a single quoting leg or a reduced number of quoting legs (for example, relative to the trading strategy order). Furthermore, the child trading strategies are the same or similar to the trading strategy associated with the trading strategy order, except for the number of legs marked as quoting legs. The child orders may be intelligently routed to the server side devices, for example, based on latency, physical location of one or more server side device, physical location of one or more exchange system, trader preference, exchange capabilities, other criteria, or any combination thereof. For example, a child order may be routed to a server side device located nearest or having the least latency to the electronic exchange system adapted to fill the child order. Based on the child orders, the server side devices generate quoting orders. The quoting orders may be submitted to the respective exchange systems. The respective exchange systems are capable of matching the quoting orders.

In an exemplary method, a computing device receives a trading strategy order for a trading strategy with multiple quoting legs. The computing device determines that the trading strategy order is for a trading strategy with multiple quoting legs. In response to determining that the trading strategy order is for a trading strategy with multiple quoting legs, the computing device generates multiple child orders. Each child order includes fewer quoting legs than the trading strategy order. The computing device may send the multiple child orders to one, two, or more server side devices.

In an exemplary computer program product, a computer readable medium has stored therein instructions executable by a processor. The instructions are executable to receive a trading strategy order associated with a trading strategy having multiple quoting legs; determine that the trading strategy is associated with a trading strategy having multiple quoting legs; generate multiple child orders; and submit the multiple child orders for matching. Each child order includes fewer quoting legs than the trading strategy order.

In another exemplary method, a trading strategy device receives a trading strategy order according to a trading strategy with multiple quoting legs. The trading strategy device splits the trading strategy order into multiple child orders. Each child order is associated with a child trading strategy having a single quoting leg. The child trading strategies are the same as the parent trading strategy except for the number of legs marked as quoting legs. The trading strategy device submits each of the multiple child orders to exchange systems adapted to fill the quoting legs in the child orders.

BRIEF DESCRIPTION OF THE DRAWINGS

It should be understood that the drawings illustrate examples. Accordingly, the various inventions, described herein, should not be to the arrangements and instrumentality shown in the drawings. Furthermore, drawings having like reference numerals indicate similar elements.

FIG. 1 illustrates an example of an electronic trading system.

FIG. 2 illustrates an example of a trading strategy.

DESCRIPTION

Figure 3B:
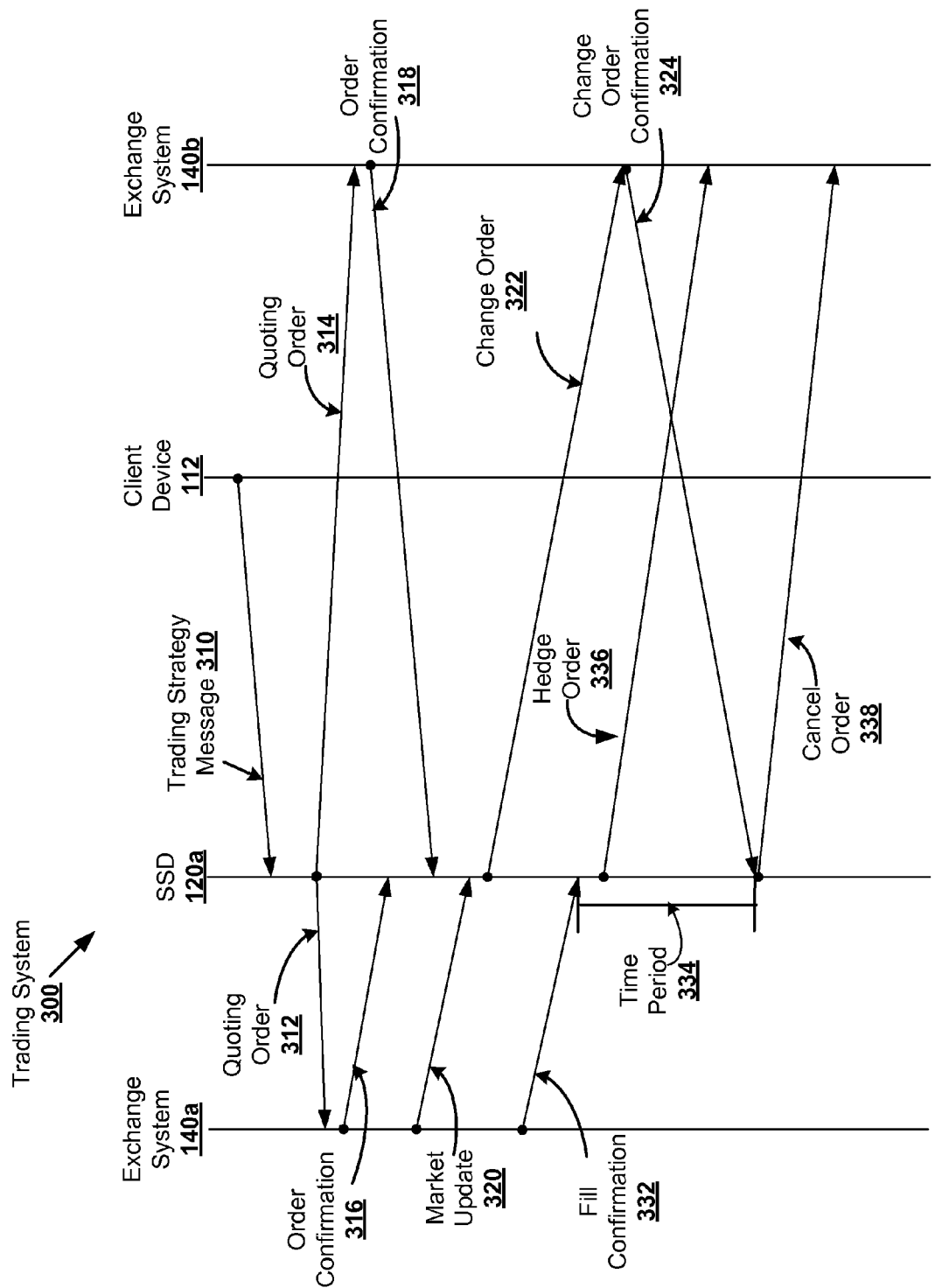
FIG. 3 illustrates an example of an electronic trading process using an exemplary electronic trading system.

There are a number of embodiments described herein that relate to electronic trading. In particular, a number of embodiments relate to placing an order for a trading strategy, which may also be referred to as "a trading strategy order," with multiple quoting legs using distributed server side device architecture. A trading strategy device, disposed between a client device and multiple server side devices, may split the trading strategy order into multiple child trading strategy orders. These child trading strategy orders may be referred to as "child orders." Each child order is according to a child trading strategy having a single quoting leg or a reduced number of quoting legs (for example, relative to the initial trading strategy order). The child trading strategies are the same or substantially the same as the trading strategy in the trading strategy order except for the number of legs marked as quoting legs. Accordingly, each child order may be associated with a single quoting leg or fewer quoting legs than the trading strategy order. The trading strategy device may send the child orders to server side devices that are adapted to work orders with exchange systems. The server side devices receive the child orders, generate quoting order for each of the quoting legs in the child orders, and submit the quoting orders. The quoting orders are submitted and worked with the exchange systems.

Before explaining any further, it is worth noting again that the various inventions are not limited in their application to the details of design and the arrangement of the components set forth in the previous and following description or as illustrated in the drawings. Instead, the previous and following description and the drawings focus on presenting concepts of various inventions that may stand alone or be combined with each other or other embodiments.

I. EXEMPLARY ELECTRONIC TRADING SYSTEMS

FIG. 1 illustrates a block diagram of an electronic trading system ("trading system") 100. The trading system 100 includes one or more client system 110, one or more server side device 120, and one or more exchange system 140. More specifically, as shown in FIG. 1, the trading system 100 includes, in addition to the client system 110, a server side device 120a, a server side device 120b, a gateway 130a, a gateway 130b, an exchange system 140a, and an exchange system 140b. The client system 110 includes a client device 112 and a trading strategy device 114. In other trading systems, additional, different, or fewer components are provided. For example, the system 100 may include "N" client systems, "N" server side devices, "N" gateways, "N" exchange systems, or any combination thereof. That is, the system 100 may be scaled to include multiple systems or components.

Client System

The client system 110 is in communication with the server side devices 120, gateways 130, exchange systems 140, or a combination thereof, for example, via one or more communication networks 102. For example, as shown in FIG. 1, the client system 110 is in communication with and coupled with the server side device 120a and gateway 130a via the communication network 102a. Similarly, the client system 110 is in communication with and coupled with the server side device 120b and gateway 130b via the communication network 102b. A communication network may include, for example, one or more communication buses, T1 lines, T3 lines, Integrated Services Digital Network (ISDN) lines, wired networks, wireless networks, point-of-presence networks, local networks, remote networks, the Internet, or any combination thereof.

The phrase "coupled with" may include directly connected to or indirectly connected through one or more intermediary components. Such intermediary components may include hardware (for example, servers, routers, gateways, and switches), software (for example, a trading application or a communication application), additional communication networks, or any combination thereof.

All or some of the client system 110 may be physically located at the same site as or a different site than one or more of the server side devices 120, gateways 130, exchange systems 140, or a combination thereof. For example, the entire client system 110 may be physically located in an office building in Milwaukee, Wis. However, the server side device 120a, gateway 130a, and exchange system 140a may be physically located in or around Chicago, Ill. and the server side device 120b, gateway 130b, and exchange system 140b may be physically located in Tokyo, Japan. In another example, which illustrates a distributed client system 110, the client device 112 may be physically located in the office building in Milwaukee, Wis. and the trading strategy device 114 may be physically located in or around Chicago, Ill.

As mentioned above, the client system 110 includes a client device 112 and a trading strategy device 114. The client system 110 may include additional, different, or fewer components, such as servers, gateways, routers, switches, computers, client devices, trading strategy devices, applications, or other communication devices. For example, multiple client devices may be provided. Some or all of the multiple client devices may use the same trading strategy device (for example, there is a many-to-one ratio between client devices and trading strategy devices). In another example, multiple client devices are provided, however, each client device uses a single trading strategy device (for example, there is a one-to-one ratio between client devices and trading strategy devices).

Client Device

The client device 112 may be a hand-held device, laptop, desktop computer, server, personal computer, communication endpoint, electronic trading workstation, a computing device, an electronic trading workstation, a portable trading device, an algorithmic trading or "black-box" system, an embedded trading system, an automated trading tool, or any combination thereof. The client device 112 may be owned, operated, controlled, programmed by, configured by, or otherwise used by a user. The term "user" may include, but is not limited to, a human (for example, a trader) or an electronic trading device (for example, including a processor and memory or an algorithmic trading system). One or more users may be involved in the ownership, operation, control, programming, configuration or other use.

The client device 112 may receive, display, or both receive and display market data. Market data may be received from an exchange system, such as exchange system 140a or exchange system 140b. Market data may include market information, which commonly includes information about one or more tradable objects. Market data may also include quote data (for example, bid/ask price data, bid/ask quantity data, market depth data), trade data (for example, last sale data, last quantity data, volume data), confirmation data (for example, fill confirmations, trade confirmations), other exchange related data, or any combination thereof. Market data may include, but is not limited to, prices for various tradable objects available for trading, the volume of bids for a tradable object at any given instant, trade confirmations indicating what trades have occurred at what quantities and/or prices, or fill confirmations indicating that a trade was filled.

Market data may also include data that represents the inside market, for example. The inside market is the lowest sell or offer price (also referred to as the "best ask") and the highest buy or bid price (also referred to as the "best bid") at a particular point in time. Market data may also include market depth data. Market depth refers to the number of trade orders that have been placed for a tradable object at a certain price at a specific time. Market depth may change as trade orders, either from the client system 110 or a different system, are received by the exchange system 140. In certain embodiments, market depth is provided for all price levels. However, in other embodiments, market depth is provided for less than all price levels. Market data may also include information such as the last traded price (LTP), the last traded quantity (LTQ), and order fill information The client device 112 may include one or more input. An input may be, for example, an input device or a network interface, or both. The input may be adapted to receive market data, user input data, both market data and user input data, other trading data (for example, identifications, passwords, algorithms), or a combination thereof. User input data may include data received from a user, such as a definition of one or more tradable objects.

Exemplary input devices include, for example, a mouse, keyboard, track ball, touch screen, joystick, touch pad, user interface, microphone, button, knob, slider, combinations thereof, or other now known or later developed user input device. For example, an input device may be a user interface. The user interface may be an application programming interface that allows a user to interact with the trading screen. The user interface may be associated with one or more display devices for presenting a text-based or graphical interface of a trading application to a user. A display device may be a computer monitor, hand-held device display, projector, and/or television. In an example, the user interface may display market data. In another example, the user interface may provide the user with an easier to use system for programming a trading strategy using blocks and connection lines to assemble an automated trading strategy, without having to understand source code. In yet another example, the user interface may be used by the user to specify or review parameters for an order using a trading application. A network interface may include hard-wired or wireless network interfaces. A universal asynchronous receiver/transmitter (UART), a parallel digital interface, a software interface, Ethernet, or any combination of known or later developed software and hardware interfaces may be used. The network interface may be linked to various types of networks, including a local area network (LAN), a wide area network (WAN), an intranet, a virtual private network (VPN), and the Internet.

The client device 112 may be used to buy or sell one or more tradable objects. A tradable object may be "real" or "synthetic." A real tradable object is a product that is listed by an exchange. A synthetic tradable object is a product that is defined by the user and is not listed by an exchange. For example, a synthetic tradable object may include a combination of real (or other synthetic) products such as a synthetic spread created by a trader utilizing a client device 112. A synthetic tradable object may be an implied, for example, a tradable object implied from one or more real tradable object.

The client device 112 may include one or more electronic computing platforms. A common electronic computing platform includes a processor and a computer readable medium that stores instructions that may be executed by the processor. Other electronic computing platforms may be used, such as computing devices or processing components.

For trading purposes, the client device 112 may also include one or more trading applications. The trading application(s) may, for example, process market data by arranging and displaying the market data in trading and charting windows. For example, the trading application(s) may also allow a user to define a tradable object and submit an order for the defined tradable object. This processing may be based on user preferences. The one or more trading applications may include one or more instructions stored on a computer readable medium. The electronic computing platform may execute the trading application to perform one or more of the functions described, illustrated, or shown herein.

The trading application(s) may include an automated trading tool. As an example, the client device 112 may be a workstation running a copy of X_TRADER®, an electronic trading platform provided by Trading Technologies International, Inc. of Chicago, Ill. As another example, the client device 112 may be a server running an automated trading tool, such as Autospreader®, which is also provided by Trading Technologies International, Inc.

Trading Strategy Device

The trading strategy device 114 may be a hand-held device, laptop, desktop computer, server, personal computer, endpoint, electronic trading workstation, a computing device, an electronic trading workstation, a portable trading device, an algorithmic trading or "black-box" system, an embedded trading system, an automated trading tool, or any combination thereof. The trading strategy device 114 may be referred to as a management device, monitoring device, splitting device, or order entry device, for example.

The trading strategy device 114 may be physically located at the same site as or a different site than the client device 112. For example, the trading strategy device 114 may be physically located in the same office or building as the client device 112. As shown in FIG. 1, the client device 112 and trading strategy device 114 may be different devices. However, in other examples, the client device 112 and trading strategy device 114 may be the same device or devices operating as a single unit. For example, the trading strategy device 114 may be integrated into the client device 112. The phrase "integrated into" may include using the same processor(s), memory, or both processor(s) and memory, having the same housing or connected housings, or otherwise joined or operating together.

However, the physical location of the trading strategy device 114 may vary depending on the trading system 100. For example, in various embodiments, the trading strategy device 114 is physically located at the same site as or a different site than one or more of the server side devices 120, gateways 130, exchange systems 140, or a combination thereof. For instances, the trading strategy device 114 may be integrated into a server side device 120. In another example, the trading strategy device 114 may be integrated into a gateway 130 adapted for communicating with an exchange system 140.

The trading strategy device 114 may include one or more electronic computing platforms. For electronic trading purposes, the trading strategy device 114 may also include one or more trading applications. The one or more electronic computing platforms may be adapted to execute the one or more trading applications, such that the client device 112 performs one or more of the functions described, illustrated, or shown herein. For example, the trading application can be executed to perform, for example, one, some, or all of acts shown in FIG. 4, FIG. 9, or FIG. 10.

The trading strategy device 114 may be adapted to transmit and receive one or more trade orders. For example, the trading strategy device 114 may receive a trading strategy order from the client device 112 and transmit one or more child trading strategy orders to the server side devices 120.

A trade order, such as a trading strategy order or a child trading strategy order, includes any of configuration data, price data, quantity data, or any combination thereof. The trade order may include all the information needed to place a quoting order, less than all the information needed to place a quoting order, more than all the information needed to place a quoting order, or a combination thereof. The amount of information in a trade order may depend on, for example, the component receiving the information, the amount of information needed to place a quoting order, the information that was previously sent, a combination thereof, or other consideration.

For example, in some embodiments, a trade order includes price data and quantity data, but not necessarily configuration data. That is, for instance, configuration data may be sent ahead of, or along with, price and quantity data that is sent to the trading strategy device or the server side device for the first time. The configuration data may be stored, for example, at the trading strategy device or the server side device. With the configuration data already at the trading strategy device or the server side device, subsequent incoming price and quantity data may be combined or used with the configuration data. If a change in the configuration data occurs, then updated configuration data may be sent ahead of, or along with, price and quantity data of the trade order following the change. In other embodiments, a trade order includes price data, but not necessarily quantity data. That is, for instance, price data may be sent ahead of, along with, or after quantity data.

The trading strategy device 114 is adapted to manage one or more client devices 112. For example, the trading strategy device 114 can be coupled with multiple client devices 112. The client devices 112 may send orders to the trading strategy device 114. The trading strategy device 114 may be adapted to receive the orders and manage submission of the orders. Management of the orders may include working, handling, directing, governing, controlling, attempting to accomplish, or succeeding in accomplishing the submission of the orders. As will be described in more detail below, management may also include splitting an order received from the client device 112.

Server Side Devices

The server side devices 120 may be servers, gateways, personal computers, other now known or later developed communication device, or a combination thereof. For example, a server side device may be a server running an automated trading tool, such as Autospreader® or Autotrader™, both of which are provided by Trading Technologies International, Inc. An automated trading tool may be controlled using the client device 112, even though the server may be physically located at, in, around, or near the exchange systems 130.

For communication purposes, the server side device 120*a* is coupled with the trading strategy device 114 and the exchange system 140*a*. The server side device 120*b* is coupled with the trading strategy device 114 and the exchange system 140*b*. For example, the server side device 120 may include or be coupled with a gateway that is in communication with an exchange system 140. The gateway may perform protocol translation.

The server side devices 120 are physically located at, near, or in the exchange systems 130. A server side device may be placed at, near, or in each exchange system where a quoting order will be worked. That is, a distributed server side device architecture is a system or environment where two or more server side devices are distributed among different exchange systems. The server side devices are adapted for working quoting orders with the exchange systems, such that a single server side device does not have to work quoting orders at multiple exchange systems.

The server side device 120 may be an automated trading server running the automated trading tool Autospreader®, provided by Trading Technologies International, Inc. An automated trading server may be in communication with an exchange system 140 via a gateway, such as a Financial Information eXchange (FIX) gateway, or may be adapted to communicate directly with the exchange system. An automated trading server and FIX gateway may be located at a site near the exchange system, for example, to increase speed and efficiency of electronic trading.

A server side device 120 may receive an order to buy and sell one or more tradable object from the trading strategy device 114 and submit the order to an exchange system 140 adapted to fill the order. Accordingly, a server side device may be adapted to work an order with an exchange system. Working an order may include submitting an order, re-quoting the order, cancelling the order, sending a hedge order, managing an outstanding order, or any combination thereof. Outstanding orders are orders that have been submitted to an exchange system but have not been filled. That is, the exchange system is attempting to match all or some of the outstanding order with a contra-side order. Managing an outstanding order may include, for example, reporting back to the client device, tracking market updates, or otherwise performing one or more trading functions.

Exchange Systems

The exchange systems 140 may be owned, operated, controlled, or used by the same or different financial exchanges (for example, the Chicago Mercantile Exchange and the Chicago Board of Trade). As discussed in more detail below, the exchange systems may be used to receive and fill orders. The exchange systems 140 may be part of the same exchange or a different exchange.

An exchange system is adapted to match orders. For example, an exchange system may include a matching engine. Matching engines may be adapted to match orders. In particular, the matching engines are adapted to match bid and offer prices. Matching engines may be implemented with software that executes one or more algorithms for matching bids and offers. The exchange systems 130 may be adapted to provide fill confirmations when an order is filled. The fill confirmations may be provided to server side devices 120, for example.

The exchange system 130 may include additional, different, or fewer components. For example, a trade database may be included to store information identifying trades and descriptions of trades. A trade database may store information identifying the time that a trade took place and the contract price. An order book module may be included to compute or otherwise determine current bid and offer prices. A market data module may be included to collect market data and prepare the data for transmission to users. A risk management module may be included to compute and determine a user's risk utilization in relation to the user's defined risk thresholds. An order processing module may be included to decompose variable defined derivative product and aggregate order types for processing by order book module and the match engine.

The exchange systems 130 may also be adapted to provide market data. The market data may be provided to the client device 112, for example, via one or more gateways. In another example, the exchange systems 130 may provide market updates. Market updates may include changes in a market (for example, changes in price), partial fills, or other updates that may impact outstanding orders. Market updates may be provided, for example, to server side devices 120 or other devices managing outstanding orders.

Once an order is filled, the exchange systems 130 may confirm the fill, for example, by sending a fill confirmation. The fill confirmation may be sent to a server side device 120. For example, in the event that the exchange system 140a matches an order, a fill confirmation may be sent to the server side device 120a. The fill confirmation may then be sent to other components. For example, the fill confirmation may be transmitted to the client device 112 and/or the trading strategy device 114. Alternatively, or additionally, the fill confirmation may be sent to the trading strategy device 114 or client device 112.

While not shown for the sake of clarity, the system 100 may include other devices that are specific to the communications architecture such as middleware, firewalls, hubs, switches, routers, gateways, exchange-specific communication equipment, modems, security managers, and/or encryption/decryption devices.

II. STRATEGY TRADING

In addition to buying and/or selling a single tradable object, a user can utilize the client device 112 to trade more than one tradable object according to a trading strategy. A trading strategy defines a relationship between two or more tradable objects to be traded. Each tradable object being traded as part of a trading strategy may be referred to as a leg or outright market of the trading strategy. One common trading strategy is a spread and trading according to a spread is referred to as spread trading. Spread trading attempts to capitalize on changes or movements in the relationships between the tradable object in the trading strategy.

When the trading strategy is to be bought, the definition for the trading strategy specifies which tradable object corresponding to each leg should be bought or sold. Similarly, when the trading strategy is to be sold, the definition specifies which tradable objects corresponding to each leg should be bought or sold. For example, a trading strategy may be defined such that buying the trading strategy involves buying one unit of a first tradable object for leg A and selling one unit of a second tradable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradable object for leg A and selling 3 units of a second tradable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3." In some instances, the spread ratio may be implied or implicit. For example, the spread ratio for a leg of a trading strategy may not be explicitly specified, but rather implied or defaulted to be "1" or "−1."

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

FIG. 2 illustrates a block diagram of an exemplary trading strategy 210. The trading strategy 210 includes "N" legs 220. A leg refers to a tradable object, an order for a tradable object, a potential order for a tradable object, or a portion of a trade associated with a tradable object. As such, a leg may also be referred to as an outright.

The trading strategy 210 defines the relationship between the tradable objects 222 for each of the legs 220 using the spread ratios 224 and multipliers 226 associated with each of the legs 220. Once defined, the tradable objects 222 in the trading strategy 210 may then be traded together according to the defined relationship.

The following discussion assumes that the spread ratio 224 and multipliers 226 for each leg are the same, unless otherwise indicated. In addition, the following discussion assumes that the signs for the spread ratio 224 and the multipliers 226 for a particular leg are the same and, if not, the sign for the multiplier 226 is used to determine which side of the trading strategy a particular leg is on.

In an illustration, which will be referred to herein as "the illustration above," the trading strategy 210 is a spread with two legs 220. Leg 1 is for tradable object A and Leg 2 is for tradable object B. The spread ratios 224 and multipliers 226 associated with Legs 1 and 2 may be 1" and "−1," respectively. The spread 210 may be defined such that when the spread 210 is bought, 1 unit of tradable object A is bought (positive spread ratio, same direction as the spread) and 1 unit of tradable object B is sold (negative spread ratio, opposite direction of the spread). In spread trading, the opposite of the definition generally applies. For example, when the definition for the spread 210 is such that when the spread 210 is sold, 1 unit of tradable object A is sold (positive spread ratio, same direction as the spread) and 1 unit of tradable object B is bought (negative spread ratio, opposite direction of the spread).

The price for the trading strategy 210 may be determined based on the definition of the trading strategy. The price for the trading strategy 210 is typically the sum of price of the tradable object 222 multiplied by the multiplier 226 for each of the legs 220 of the trading strategy 210.

In the illustration above, if a user believes that tradable object A typically has a price 10 greater than tradable object B, then the user may want to buy the spread whenever the difference in price between tradable objects A and B is less than 10 and sell the spread whenever the difference is greater than 10. As an example, tradable object A may be at a price of 45 and tradable object B may be at a price of 40. The current spread price would then be $(1)(45)+(-1)(40)=5$, which is less than the typical spread of 10. Thus, the trader may buy 1 unit of the spread, which results in buying 1 unit of tradable object A at a price of 45 and selling 1 unit of tradable object B at 40. At some later time, the typical price difference may be restored and the price of tradable object A is 42 and the price of tradable object B is 32. At this point, the price of the spread is now 10. Accordingly, 1 unit of the spread may be sold to close out the position (for example, sell 1 unit of tradable object A and buy 1 unit of tradable object B), and profit on the total transaction. In particular, while the trader bought tradable object A at a price of 45 and sold at 42, losing 3, the trader sold tradable object B at a price of 40 and bought at 32, for a profit of 8. Thus, the user made 5 on the buying and selling of the spread.

The illustration above assumes that there is sufficient liquidity and stability that the tradable objects can be bought and sold at the market price at approximately the desired times. This allows the trader to achieve the desired price for the spread 210. However, more generally, a user determines a desired price at which to buy or sell a particular trading strategy. Using an automated trading tool, for example, the user may attempt to achieve that desired price by buying and selling the legs at appropriate prices. For example, when a user enters an order to buy or sell the trading strategy 210 at a desired price, the automated trading tool may automatically place an order, which may be referred to as quoting an order, for one of the tradable objects 222 of the trading strategy 210 to achieve the desired price for the trading strategy (also referred to as a desired strategy price, desired spread price, and/or a target price).

The leg for which the order is placed may be referred to as the quoting leg. The other leg may be referred to as a lean leg or a hedge leg. The price that the quoting leg is quoted at is based on the best price that an order could be filled at in the hedge leg. The best price is typically the best bid price when selling and the best ask price when buying. The best price in the hedge leg is also known as the leaned on price, lean price, or lean level. As the leaned on price changes, the price for the order in the quoting leg may also change to maintain the desired strategy price. When the quoting leg is filled, an order in the hedge leg may be submitted to complete the strategy. This order may be referred to as an offsetting or hedging order and is typically quoted at the leaned on price. If the order at the leaned on price is not filled (or filled sufficiently to achieve the desired strategy price), then the trader is said to be "legged up" because the trader has not achieved the desired strategy relationship according to the trading strategy definition.

Depending on the trading strategy, the price of a quoted leg may be based on all or less than all of the other legs. As another example, the order parameters of an order in a quoted leg may lean on other types of market conditions in the other legs such as the last traded price (LTP), the last traded quantity (LTQ), a theoretical value, multiple quantities such as quantities closer to the inside market, or some other reference point.

A trading strategy may be quoted in multiple (for example, two or more, some, or all) legs. In such situations, each quoted leg still leans on the other legs, even if the other legs are also quoting legs. When one of the quoted legs is filled, the orders in the other quoted legs are typically cancelled and then appropriate hedge orders are placed based on the leaned on prices that the filled leg was based on.

When buying and selling trading strategies, users generally desire to achieve the target price for the trading strategy. That is, traders want to buy and sell, according to the definition of the trading strategy, the tradable objects of the trading strategy so as to result in a particular strategy price being realized.

To achieve the target price for the trading strategy, as markets fluctuate, there may be a need to re-quote one or more of the quoting legs based on a fluctuating price of a hedge leg. For example, in the event that the price of a hedge leg being worked at a first exchange fluctuates, the order for a quoting leg at a second exchange may need to be cancelled and replaced with a replacement order having a replacement quoting leg definition. The replacement quoting leg definition generally sets forth a new price for the quoting leg based on the new price for the hedge leg.

FIG. 3A illustrates an example of working an order for a quoting leg based on a fluctuating price of a hedge leg. A trading system 300, which may include one or more components of the system 100 of FIG. 1, may be used to work the order. The trading system 300 includes a server side device 120a at, near, or in the exchange system 140a. However, a server side device is not located at, near, or in the exchange system 140b. Instead, the server side device 120a is adapted to work quoting orders at both the exchange system 140a and the exchange system 140b. The trading system 300 does not include a trading strategy device 114. Accordingly, the client device 112 submits orders to the server side device 120a.

The system 300 is configured so that a single server side device 120a is used to work the quoting orders. This configuration allows the server side device 120a to act as a central hub for all of the quoting orders. That is, the server side device 120a manages each of the orders based on the status or changes to orders at each of the exchange systems.

The trading system 300 is adapted to facilitate the electronic trading of an order to buy or sell according to a trading strategy, which is referred to as a trading strategy order 310. In this example, both leg A and leg B are marked as quoting legs. As shown in FIG. 3A, the server side device 120a receives the trading strategy order 310 from the client device 112. The trading strategy order 310 is associated with a trading strategy including leg A and leg B. Leg A is associated with tradable object A, which is electronically traded at exchange system 140a, and leg B is associated with tradable object B, which is electronically traded at exchange system 140b. Exchange system 140a is a different than exchange system 140b.

Once the trading strategy order 310 is received, the server side device 120a submits a quoting order 312 to the exchange system 140a. The quoting order 312 may be an order, for example, configured according to a protocol required by exchange system 140b, for leg A. Similarly, the server side device 120a submits a quoting order 314 to the exchange system 140b. The quoting order 314 may be an order, for example, configured according to a protocol required by exchange system 140b, for leg B. The quoting order 312 leans on tradable object B being traded at exchange system 140b. Similarly, quoting order 314 leans on tradable object A being traded at exchange system 140a.

Upon receiving the quoting orders 312, 314, the exchange systems 130a, 130b confirm receipt of the quoting orders 312, 314 by transmitting order confirmations 316, 318 back to the server side device 120a. Furthermore, the exchange systems begin attempting to match the quoting orders with contra-side orders that have been received or will be received by the exchange systems.

A market update 320 is transmitted to the server side device 120a from the exchange system 140a. The market update 320 includes a price change related to the trading strategy. For example, the market update indicates that the price for tradable object A, which leg B is leaning on, has changed at the exchange system 140a. Accordingly, to achieve the target price for the trading strategy, as originally defined by the client device, the server side device 120a submits a change order 322 to the exchange system 140b. The change order 322 changes the price associated with a quoting order in the order book. The adjusted price value is based on the change in price indicated in the market update 320. The exchange system 140b confirms receipt of the change order 322 by sending a change order confirmation 324 to the server side device 120a. Note that in the event that the exchange system 140b does not support a change order, the server side device 120a may send a cancel/replace order or two separate commands to cancel and replace the order in the order book, for example.

Prior to receiving the change order confirmation 324, the server side device 120a receives another market update 326, for example, indicating another price change impacting the pricing of the trading strategy. However, in some instances, until the change order confirmation 324 is received (for example, during the time period 328), the server side device 120a is unable to send a change order 330. That is, the change order 330 should not be sent because the server side device 120a has not received an identifier for the order associated with the change order 322. The exchange system 140b places this identifier in the change order confirmation 324 so that the server side device 120a can reference the correct order when changing, replacing, or cancelling the order. Without this identifier, the server side device 120a is unable to properly reference the order. Accordingly, the exchange system 140b will be unable to identify the correct order and take appropriate action. Furthermore, in other instances, the server side device 120a must wait for the change order confirmation 324 to ensure that the order at the exchange was properly received and placed in the order book. Plus, there is the possibility that the change was filled. This would cause the trader to be at risk of being double filled, for example, in the event that the change order 330 was sent prior to receiving the change order confirmation.

During the time period 328, the server side device 120a is aware that the market has changed but is unable to place a change order. It may be advantageous to reduce this time period as much as possible, so that the exchange system 140b receives the change order 330 as fast as possible.

Furthermore, as shown in FIG. 3B, the system 300 leaves the trader at risk of being legged, double filled, or both legged and double-filled for an extended period of time. The system 300 is the same or similar as the system 300 of FIG. 3A. However, instead of the market update 326, prior to receiving the change order confirmation 324, the server side device 120a receives a fill confirmation 332. The fill confirmation 332 indicates that exchange system 140a matched the quoting order 312. In response to receiving the fill confirmation 332, the server side device 120a attempts to send a hedge order 336 and a cancel order 338 to the exchange system 140b. The hedge order 336 places an order for the tradable object associated with the leg that quoting leg A was leaning on. The cancel order 340 cancels the replacement order for the tradable object in quoting leg B (for example, the order that was placed as a result of the change order 322).

The hedge order 336 can be placed at anytime, for example, subsequent to a fill. For example, as shown in FIG. 3B, the hedge order 336 may be placed after receiving the fill confirmation 332 and prior to receiving the change order confirmation 324. However, in other embodiments, the hedge order 336 may not be placed until the change order 338 is received and the cancel order 338 is transmitted.

However, the server side device 120a is unable to place the cancel order 338 until the server side device 120a receives the change order confirmation 324, since the server side device 120a needs the confirmation information in the change order confirmation 324 to be able to cancel the change order 322. That is, the server side device 120a is unable to place the cancel order 338 during the time period 334 because the server side device 120a is unable to identify the change order 322 at the exchange 130b without the identifier, as discussed above. This may result in a delay in placing the hedge order 330, the cancel order 340, or both the hedge order 330 and cancel order 340. As shown in FIG. 3B, even though the hedge order 336 may not be delayed, the cancel order 338 might be delayed and as a result the user might get double filled or legged.

The risk of being legged arises when the prices needed to obtain the trading strategy are no longer available. For example, a trader is considered to be legged after being filled in leg A and is unable to be filled in leg B at a price that satisfies the trading strategy price. For example, assume that the trading strategy price is "5" and leg A was filled at a price of "10." Since the trading strategy price is equivalent to the price of leg A minus the price of leg B, the trader would need to obtain a price of "5" for leg B. However, if the market moves against the trader (e.g., the price of leg B drops from "5" to "4", after leg A is filled or while leg A is being filled, the trader is considered to have been legged because the trading strategy price of "5" is no longer available. Furthermore, a trader is at risk of being double filled when both the change order 322 and the hedge order 336 are being worked at the exchange system 140b. That is, to obtain the trading strategy price, a hedge order 336 is sent to the exchange system 140b when the fill confirmation 326 is received. However, since the server side device 120a has yet to receive the change order confirmation 324, the change order 322 has not been cancelled. Accordingly, two orders are being worked at exchange system 140b. This leaves the trader at risk of being double filled.

III. EXEMPLARY ELECTRONIC TRADING PROCESSES

Figure 4A:
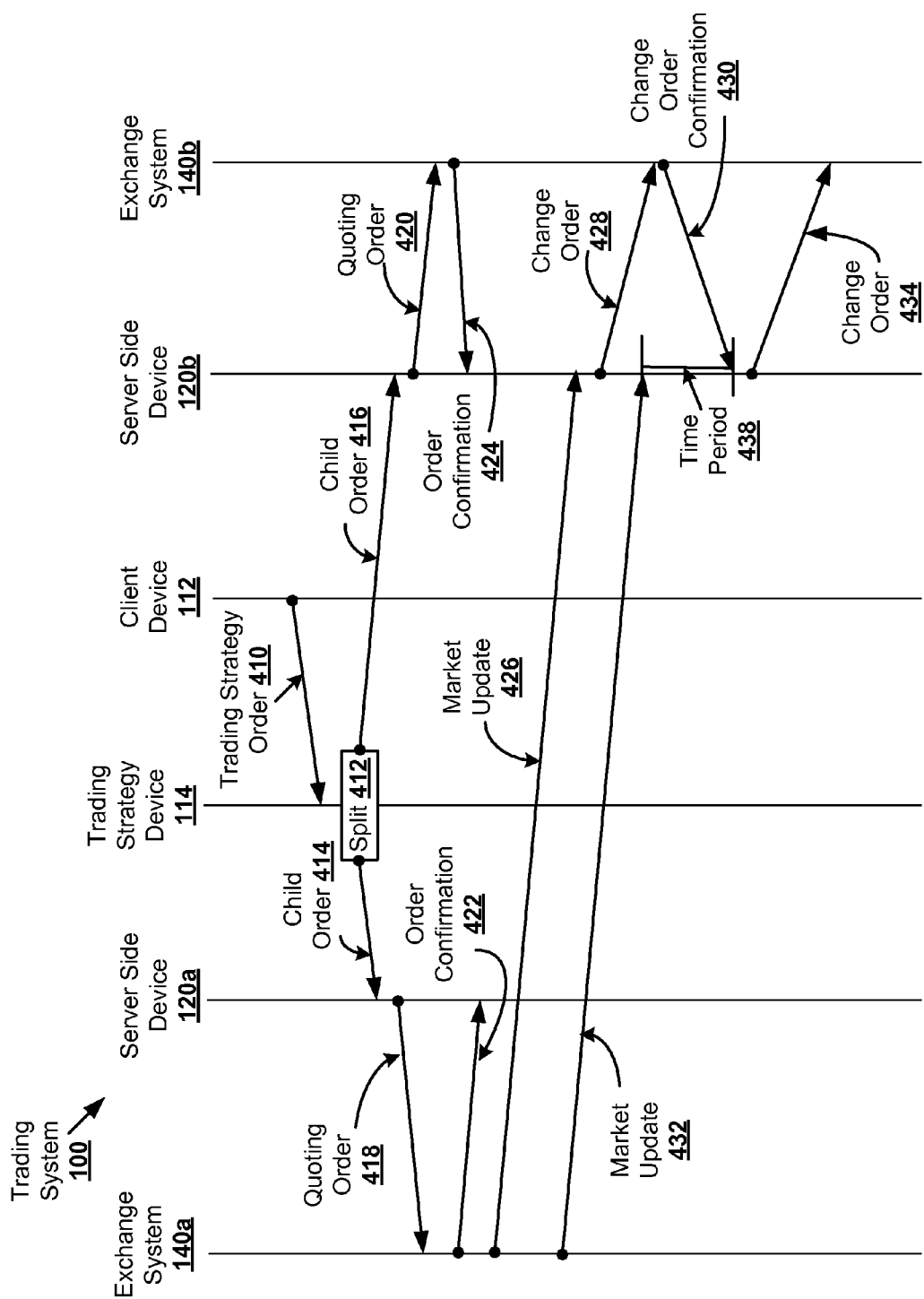
FIG. 4 illustrates another example of an electronic trading process using the electronic trading system of FIG. 1.

FIG. 4A illustrates an exemplary trading process using the trading system 100 of FIG. 1. The client device 112 is adapted to receive a trading strategy definition. The trading strategy definition defines a trading strategy to be bought or sold. For example, the trading strategy definition may include any of price data, quantity data, configuration data, or any combination thereof. The trading strategy definition may be received from the client device 112. For example, the trading strategy definition may be automatically or manually input by a trader into the client device. In another example, all or some of the trading strategy definition may be received at the same or different times. For example, a trader may define a trading strategy (e.g., define a spread) and send the configuration data to the trading strategy device 114 or the server side devices. Then, during a trading session, the price and quantity information may be defined, for instance, by selecting a price and quantity along a price axis.

The client device 112 may generate a trading strategy order 410, for example, according to the trading strategy definition. Once generated, the client device 112 may send the trading strategy order 410 to the trading strategy device 114. The trading strategy order 410 may be sent at the request from a user (for example, by clicking a "Send" button) or automatically. For example, a trader may utilize an electronic trading workstation to place the trading strategy order. As another example, an automated trading tool may calculate one or more parameters for an order and automatically send the order. In some instances, an automated trading tool may prepare the order to be sent but not actually send it without confirmation from the user.

In some embodiments, the client device 112 may designate the trading strategy device 114 as the recipient of the trading strategy order 410, for example, using an address or communication path allocated to the trading strategy device 114. However, in other embodiments, the trading strategy order 410 may be sent to another device that routes the trading strategy order 410 to the trading strategy device 114.

The trading strategy order 410 may be associated with a trading strategy having multiple quoting legs. For example, the trading strategy order 410 may be associated with a spread having leg A and leg B. Leg A is associated with tradable object A traded at exchange system 140a and leg B is associated with tradable object B traded at exchange system 140b. Both leg A and leg B are marked as quoting legs, for example, when the trading strategy is defined using the client device 112. Accordingly, leg A leans on tradable object B and leg B leans on tradable object A. Additional quoting legs and/or non-quoting legs may be defined in the trading strategy associated with the trading strategy order 410. The exchange system 140a may be different than the exchange system 140b.

The trading strategy device 114 may receive the trading strategy order 410. Receiving the trading strategy order 410 may include receiving the trading strategy order 410, requesting, retrieving, or otherwise obtaining the trading strategy order 410.

In various embodiments, as shown in FIG. 4A, the trading strategy device 114 may be disposed between the client device 112 and one, some, or all of the server side devices 120. Accordingly, the trading strategy device 114 may receive the trading strategy order 410 before or at the same time as one, some, or all of the server side devices 120. For instance, if the trading strategy device 114 is disposed in the client system 110, the trading strategy device 114 may receive the trading strategy order prior to the server side device 120a and server side device 120b. However, in the event that the trading strategy device 114 is part of the server side device 120a, the trading strategy device 114 may receive the trading strategy order 410 before the server side device 120b.

Once received, the trading strategy device 114 may split 412 the trading strategy order 410 into multiple child trading strategy orders 414, 416. Accordingly, the trading strategy order 410 may be referred to as, for example, an initial, original, received, or parent order. The child orders 414, 416 may be referred to as, for example, sub, split, or derivative orders.

Splitting 412 the trading strategy order 410 may include, as discussed in more detail below, identifying a trading strategy with multiple quoting legs, defining multiple child trading strategies, generating multiple child trading strategy orders, submitting the multiple child trading strategy orders, or any combination thereof. Splitting 412 is not limited to those acts described above. Additional, different, or fewer acts may be performed when splitting a trading strategy order.

The trading strategy device 114 is adapted to identify a trading strategy having multiple quoting legs. Identifying a trading strategy order 410 associated with a trading strategy having multiple quoting legs may include recognizing, calculating, or otherwise determining that the trading strategy includes multiple legs marked as quoting legs. For instance, the trading strategy device 114 may analyze each leg in the trading strategy order 410, determine whether each leg is a quoting leg or a non-quoting leg, and count the number of legs that are marked as quoting legs. In another example, the client device 112, for example, when generating the trading strategy order, indicates the number of quoting legs in a field designated for indicating the number of quoting legs in trading strategy order 410. Accordingly, the trading strategy device 114 may read and analyze that field.

In response to identifying a trading strategy order 410 associated with a trading strategy including multiple quoting legs, the trading strategy device 114 may define multiple child trading strategies. The child trading strategies are the same as the trading strategy associated with the trading strategy order 410, except for the number of legs that are being quoted. That is, the number of legs marked as quoting legs in the child trading strategies is different than (e.g., less than) the number of legs marked as quoting legs in the trading strategy associated with the trading strategy order 410. For instance, the child trading strategies may include a single quoting leg or a reduced number of quoting legs (for example, relative to the number of quoting legs in the trading strategy order 410). The child trading strategies are associated with tradable objects. For example, in FIG. 4A, a first child trading strategy is associated with tradable object A and a second child trading strategy is associated with tradable object B. In the first child trading strategy, leg A is marked as a quoting leg. Similarly, in the second child trading strategy, leg B is marked as a quoting leg.

The number of child trading strategies that are defined depends, for example, on the number of quoting legs in the trading strategy order 410. Each child trading strategy may have a single quoting leg. In another example, multiple quoting legs may be included in a single child trading strategy. Quoting legs may be grouped based on the exchange system adapted to match the quoting legs. For example, quoting legs that are traded at the same exchange system may be included in the same child trading strategy. However, even when grouped together, the number of quoting legs in the child order is less than the number of quoting legs in the trading strategy order 410.

It should be understood that the present system also supports working a trading strategy order without splitting the trading strategy order. For example, the trading strategy device 114 may receive a trading strategy order 410 for a trading strategy with multiple quoting legs and may send the trading strategy order 410 to the server side device 120a. That is, the trading strategy device 114 may determine whether or not to split the trading strategy order 410, for example, based on latency, physical location of one or more exchange systems, one or more other considerations that optimize the trading environment, or a combination thereof.

Each child trading strategy has zero, one, or more quoting legs. The number of quoting legs in the child trading strategies is less than the number of quoting legs in the trading strategy of the initial order. In an example, if the trading strategy, as specified in the trading strategy order 410, includes two quoting legs, the trading strategy device 114 may define a first trading strategy having a single quoting leg and a second trading strategy having a single quoting leg. In another example, if the trading strategy, as specified in the trading strategy order 410, includes twenty-two quoting legs, the trading strategy device 114 may define a first trading strategy having a single quoting leg; a second trading strategy having a single quoting leg; and a third trading strategy having twenty quoting legs.

Once one, some, or all the child trading strategies are defined, the trading strategy device 114 generates multiple child trading strategy orders ("child orders") 414, 416. Each child order 414, 416 may include a child trading strategy including a single quoting leg or a reduced number of quoting legs (for example, relative to the number of quoting legs in the trading strategy order received from the client device 112). Any number (for example, two or more) of child orders may be generated, for example, depending on the complexity of the trading strategy in the trading strategy order 410. For instance, the trading strategy device 114 may generate a child order for each quoted leg in the trading strategy associated with the trading strategy order 410. In another example, the trading strategy device 114 may minimize the number of child orders that need to be generated, for example, by grouping child trading strategies. The legs or trading strategies may be grouped, for example, based on latency, physical location of the server side devices or exchange systems or gateways, trader preference, exchange capabilities, other now known or later developed criteria, or any combination thereof. This may reduce the volume of child orders being transmitted through the electronic trading system 100.

All, some, one, or none of the legs in the child orders may be quoting legs. The child orders may have any number of non-quoting legs and/or quoting legs. The number of child orders may depend on, for example, the number of legs in the trading strategy, the number of quoting legs, latency, capabilities of the exchanges, or any combination thereof. The number of non-quoting legs and quoting legs in the child orders may be the same or different. The number of non-quoting legs and quoting legs may or may not vary between child orders. For example, in the child orders, quoting legs may be mixed with other quoting legs or non-quoting legs. However, a single non-quoting leg and quoting leg may, alternatively or additionally, stand alone. The trading strategy device 114 determines the number of child orders, the number of non-quoting legs in each child order, the number of quoting legs in each child order, or a combination thereof based on, for example, latency in submitting the child orders. The trading strategy device 114 may minimize the time for submitting the child orders.

Figure 5:
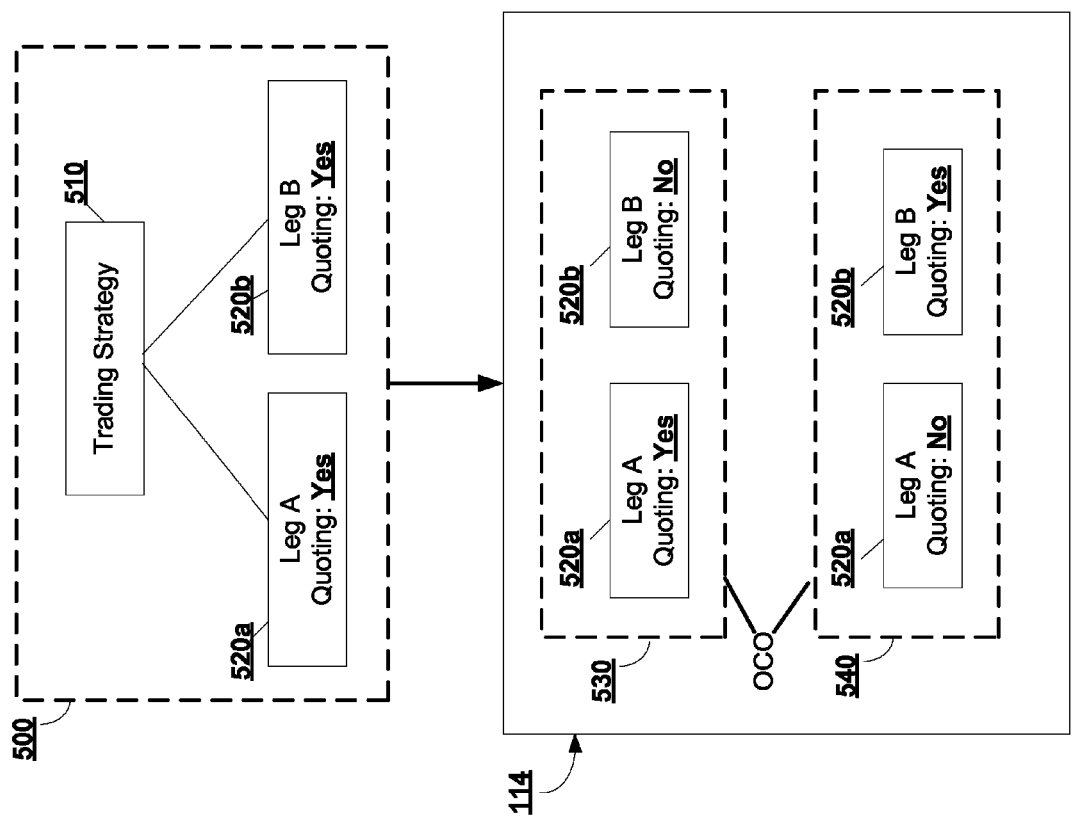
FIG. 5 illustrates an example of splitting a trading strategy order.
Figure 6:
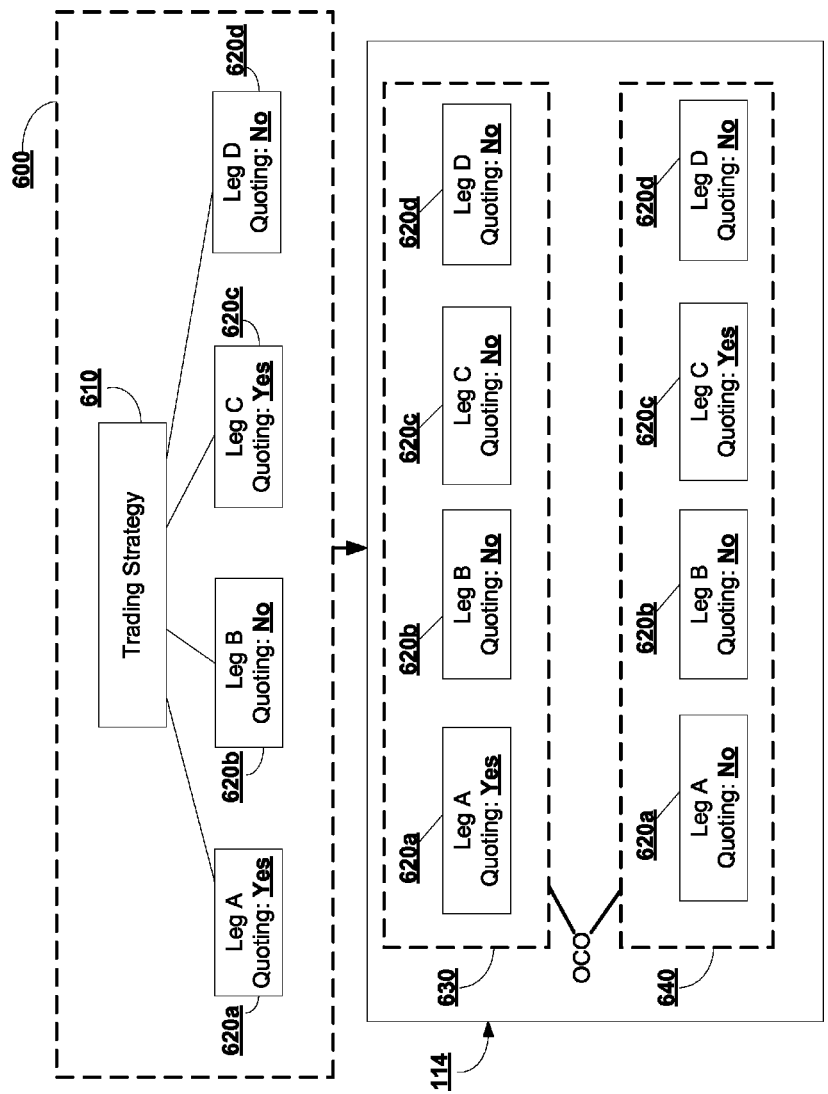
FIG. 6 illustrates another example of splitting a trading strategy order.
Figure 7:
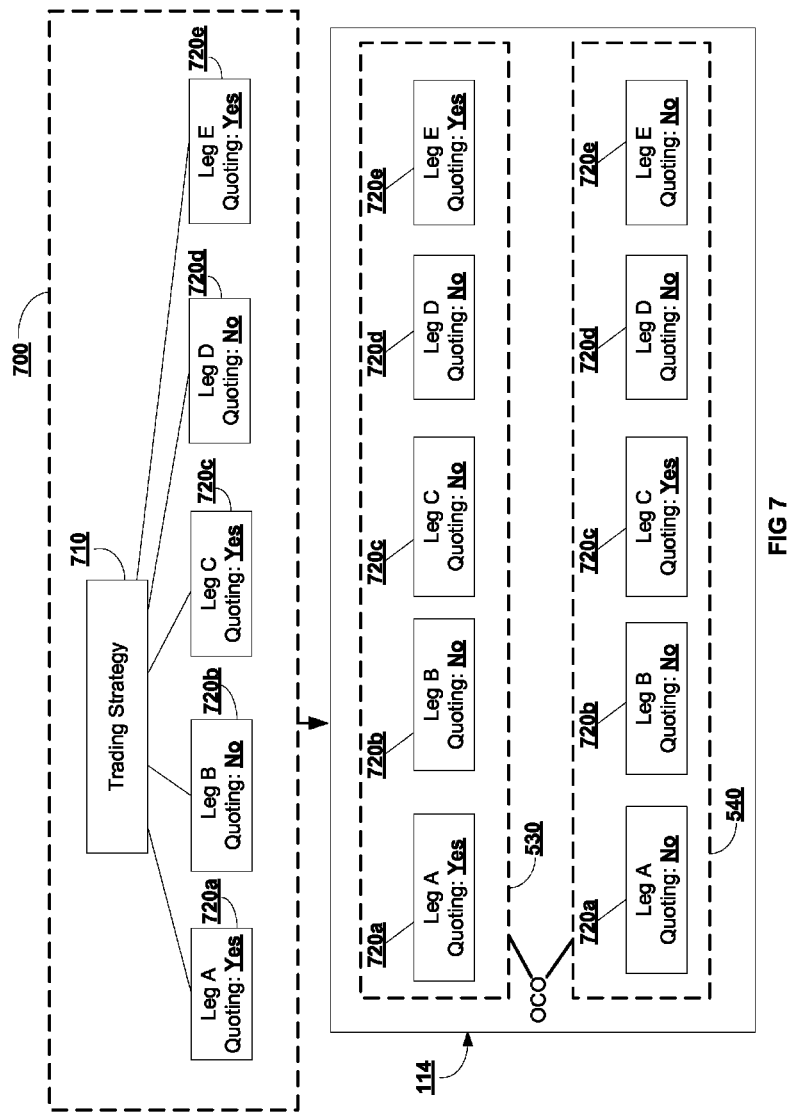
FIG. 7 illustrates yet another example of splitting a trading strategy order.

FIG's 5-7 illustrate examples of splitting an order including multiple quoting legs. The examples shown in FIG's 5-7 are non-exhaustive examples. As will be explained in more detail below, FIG. 5 illustrates splitting a trading strategy associated with a trading strategy having two legs into two child orders, where each child order includes a single quoting leg. FIG. 6 illustrates splitting a trading strategy associated with a trading strategy having four legs into two child orders, where each child order includes a single quoting leg. FIG. 7 illustrates splitting a trading strategy associated with a trading strategy having five legs into two child orders, where one of the child orders includes multiple quoting legs and the other child order includes a single quoting leg. Other examples, for example, for different trading strategies, are intended to be included in the scope of this patent document.

FIG. 5 illustrates a trading strategy order 500 for a trading strategy 510 including two quoting legs 520a and 520b. That is, the order 500 includes multiple quoting legs 520a and 520b. The trading strategy device 114 may receive the order 500, for example, from a client device. The trading strategy device 114 may analyze the order 500 and identify that the order 500 includes multiple quoting legs or more than one quoting leg. Identifying may include counting the number of legs that are marked as quoting legs.

In FIG. 5, the trading strategy device 114 may determine that the order 500 includes two quoting legs. In response to identifying multiple quoting legs, the trading strategy device 114 may generate a first child order 530 and a second child order 540. In this example, the first child order 530 includes both legs 520a, 520b but only leg 520a is marked as a quoting leg. Leg 520b is a non-quoting leg. That is, when generating the first child order 530, the trading strategy device 114 may change the second leg 520b from a quoting leg to a non-quoting leg. Similarly, the second child order 540 includes both legs 520a, 520b but only leg 520b is a quoting leg. Leg 520a is a non-quoting leg. That is, when the second child order 540 is generated, the trading strategy device 114 may change the first leg 520a from a quoting leg to a non-quoting leg. The first child order 530 may be submitted to the server side device 120a. The second child order 540 may be submitted to the second server side device 120b.

The server side devices 120 may submit quoting orders for each of the quoting legs in the child orders to the exchange systems where orders for the quoting leg(s) are matched and filled. In this example, the first exchange system fills orders for the first leg 520a and the second exchange system fills orders for the second leg 520b. As shown, the first child order 530 and second child order 430 may be marked as an order-cancels-order (OCO) type of order relative to each other, such that fully filling the quoting leg in one child order will subsequently cancel the other child order. OCO behavior may reduce the other child quantity based on the filled or legged quantity in the child order of which a quoting leg got filled. This will ensure that except for in-flight conditions, a trader will not be double filled due to in-flight conditions that can occur even if both quoting legs are managed from a single location.

FIG. 6 illustrates a trading strategy order 600 for a trading strategy 610 including two quoting legs 620a, 620c and two non-quoting legs 620b, 620d. The trading strategy device 114 may receive the order 600, for example, from a client device. The trading strategy device 114 may analyze the order 600 and identify that the order 600 includes multiple quoting legs or more than one quoting leg. Identifying may include counting the number of legs that are marked as quoting legs.

The trading strategy device 114 may determine that the order 600 includes two quoting legs 620a, 620c. In response to identifying multiple quoting legs, the trading strategy device 114 may generate a first child order 630 and a second child order 640. In this example, the first child order 630 includes legs 620a-d but only leg 620a is marked as a quoting leg. Legs 620b-d are marked as non-quoting leg in the first child order 630. The second child order 640 includes legs 620a-d but only leg 620c is marked as a quoting leg. Legs 620a, 620b, and 620d are marked as non-quoting legs. The first child order 330 may be submitted to the first server side device 120a, since orders for the quoting leg 620a are filled at the first exchange system 140a. The second child order 340 may be submitted to the second server side device 120b, since orders for the quoting leg 620c are filled at the second exchange system 140b. As shown, the first child order 630 and second child order 630 may be marked as an order-cancels-order (OCO) type of order, such that filling the quoting leg will subsequently cancel the other order.

FIG. 7 illustrates a trading strategy order 700 for a trading strategy 710 including three quoting legs 720a, 720c, 720e and two non-quoting legs 720b, 720d. In this example, quoting legs 720a, 720e are matched and filled at the same exchanges system. Accordingly, the trading strategy device 114 may include quoting legs 720a, 720e in the same child order. As shown in FIG. 7, the trading strategy device 114 may receive the order 700, for example, from a client device. The trading strategy device 114 may analyze the order 700 and identify that the order 700 includes multiple quoting legs or more than one quoting leg. Identifying may include counting the number of legs that are marked as quoting legs.

The trading strategy device 114 may determine that the order 700 includes two quoting legs 720a, 720c. In response to identifying multiple quoting legs, the trading strategy device 114 may generate a first child order 730 and a second child order 540. In this example, the first child order 730 includes legs 720a-d but only legs 720a, 720e are marked as a quoting leg, since legs 720a, 720e are filled at the same exchange system. Legs 720b-d are marked as non-quoting legs in the first child order 730. The second child order 540 includes legs 720a-d but only leg 720c is marked as a quoting leg. Legs 720a, 720b, 720d, 720e are marked as non-quoting legs. The first child order 730 may be sent to the first server side device 120a, since quoting legs 720a, 720e are filled at the first exchange system 140a. The second child order 340 may be submitted to the second server side device 120b, since the quoting leg 420c are filled at the second exchange system 140b. As shown, the first child order 730 and second child order 730 may be marked as an order-cancels-order (OCO) type of order, such that filling the quoting leg will subsequently cancel the other order.

As an alternative to the example of FIG. 7, the trading strategy device 114 may generate three, different child orders, as opposed to the two child orders. Each child order may include a single quoting leg, which may be associated with a tradable object. For example, a first, second, and third child order may be associated with first, second, and third tradable objects, respectively. The first and second tradable objects are traded at a first exchange system and the third tradable object may be traded at a second exchange system. Accordingly, the first and second child orders, which are different orders, may be transmitted to the first exchange and the third child order may be transmitted to the second exchange system.

Child orders may have multiple quoting legs that are quoted at multiple exchange systems. As will be discussed below, a series of trading strategy devices 114 may be used to submit the child orders. For example, a first trading strategy device (for example, located in Chicago) may split a trading strategy order (for example, generated by a client device located in Milwaukee) into a first child order and a second child order. The first child order may include a first quoting leg associated with a first tradable object that is traded at a first exchange system (for example, located in Europe) and a second quoting leg associated with a second tradable object that is traded at a second exchange system (for example, located in Japan). The second child order may include a third quoting leg associated with a third tradable object that is traded at a third exchange system (for example, located in Chicago). The first trading strategy device may send the first child order to a second trading strategy device (for example, located in Europe) and the second child order to a server side device associated with the third exchange system for submission. The second trading strategy device may split the first child order into a fourth child order and a fifth child order. The fourth and fifth child orders may be sent to server side devices associated with the respective exchange systems.

A server side device 120 may work with multiple exchanges, such that two or more quoting legs in a child order have quoting orders that are worked at different exchanges. For example, a child order may be associated with a first quoting leg that is worked at a first exchange and a second quoting leg that is worked at a second exchange. A server side device 120 may work orders for the first quoting leg and the second quoting leg, even though the orders are being worked at different exchanges.

Referring back to FIG. 4A, in response to determining that the trading strategy order 410 includes leg A and leg B, both of which are marked as quoting legs, the trading strategy device 114 may define a first child trading strategy including leg A and a second child trading strategy including leg B. Then, the trading strategy device 114 may generate a child order 414 for the first child trading strategy and a child order 416 for the second child trading strategy. Accordingly, the child order 414 includes leg A, which is marked as a quoting leg, and the child order 416 includes leg B, which is marked as a quoting leg.

The trading strategy device 114 may intelligently route the multiple child orders 414, 416. For example, a child order can be sent to server side devices 120 adapted to work the child order with a respective exchange system 140 adapted to fill the quoting legs in the child orders. In the event that there are multiple server side devices 120 adapted to work a child order, the trading strategy device 114 may send the child order to a server side device 120 located at a site nearest to the exchange system 140. For example, as shown, the child order 414 may be sent to the server side device 120a, which is located nearest to the exchange system 140a, and the child order 416 may be sent to the server side device 120b, which is located nearest to the exchange system 140b.

Furthermore, the trading strategy device 114 may select a communication path for sending the child orders based on latency. Latency may include the time required for a receiving device, such as a server side device 120 or exchange system 140, to receive a child order from the trading strategy device 114. The trading strategy device 114 may reduce or minimize latency, for example, by submitting a child order via a communication path that has the least or a reduced amount of delay between the trading strategy device 114 and the exchange systems. The communication path may connect the trading strategy device 114 and the exchange systems. In one example, the communication path may include communication devices, such as communication nodes, routers, servers, etc., that may report delay back to the trading strategy device 114. The trading strategy device 114 may analyze the information to determine the optimum (for example, with the least latency) communication path.

Although FIG. 4A illustrates splitting the trading strategy order 410 with a single trading strategy device 114, a series of (for example, two, three, or more) trading strategy devices may be used for splitting the trading strategy order 410. The series of trading strategy devices may split the trading strategy order at various layers or locations of the trading system 100. Multi-layer, multi-location, or both multi-layer and multi-location splitting may be performed by one or more trading strategy device 112. For example, a first trading strategy device, such as the trading strategy device 114, may split the trading strategy order 410 into a first child order and a second child order. The first child order, including multiple quoting legs, may be transmitted to a second, different trading strategy device for splitting again.

Once a child order is received, the server side device 120 may submit an order for one or more quoting legs ("quoting order") to an exchange system adapted to match the quoting leg. The one or more quoting legs in the quoting order may be the quoting legs defined in the child orders. For example, as shown in FIG. 4, in response to receiving the first child order 414, the server side device 120*a* may submit a quoting order 418 to the exchange system 140*a*. The quoting order 418 may include the first quoting leg Q1. In response to receiving the second child order 416, the server side device 120*b* may submit quoting order 420 to the exchange system 140*b*. The quoting order 420 may include the second quoting leg Q2.

The exchange systems 130*a*, 130*b* may confirm receipt of quoting order 418 and Q2 quoting order 420 by sending an order confirmation 422 and order confirmation 424, respectively. The order confirmations 422, 424 may include confirmation information that allows the server side devices 120*a*, 120*b* to work the quoting orders 418, 420, respectively. For example, the confirmation information may include identification information that allows the server side device 120*a* to identify the quoting orders 312, 314 when placing subsequent orders, such as cancels or hedge orders. Without the confirmation information, the server side devices 120*a*, 120*b* may be unable to cancel, replace, or cancel or replace one or both of the quoting orders 418, 420.

The server side devices 120*a*, 120*b* may be adapted to work the quoting order 418 and the quoting order 420, respectively. As discussed above, working an order may include re-quoting the order, cancelling the order, sending a hedge order, managing an outstanding order, or any combination thereof.

For example, as shown in FIG. 4A, the server side device 120*b* may receive a market update 426 from the exchange system 140*a*. The market update 426 may indicate a change in price of the leg that the quoting order 420 is leaning on. Accordingly, to achieve the target price for the trading strategy, as defined in the trading strategy order 410, the server side device 120*b* may submit a change order. The change order 428 changes the quoting order 420, such that the quoting order 420 has an adjusted price value. The adjusted price value is based on the change in price indicated in the market update and ensures that the target price for the trading strategy, as markets fluctuate, is achieved. The exchange system 140*b* may confirm receipt of the change order 428 by sending a change order confirmation 430 to the server side device 120*b*.

However, prior to the server side device 120*b* receiving the change order confirmation 430, the server side device 120*b* receives another market update 432 from the exchange system 140*a*. The market update 432 is different than the market update 426. For example, the market update 432 indicates yet another price change for tradable object A. Until the server side device 120*b* receives the change order confirmation 430 for the change order 428, the change order 434, which adjusts the price value for quoting order 420, cannot be sent. However, since the server side device 120*b* is located in, at, or near the exchange system 140*b* the time period 438 that the server side device 120*b* must wait is reduced, for example, because the change order confirmation 430 does not have to be sent all the way back to the server side device 120*a*, as shown in FIG. 3A.

Figure 4B:
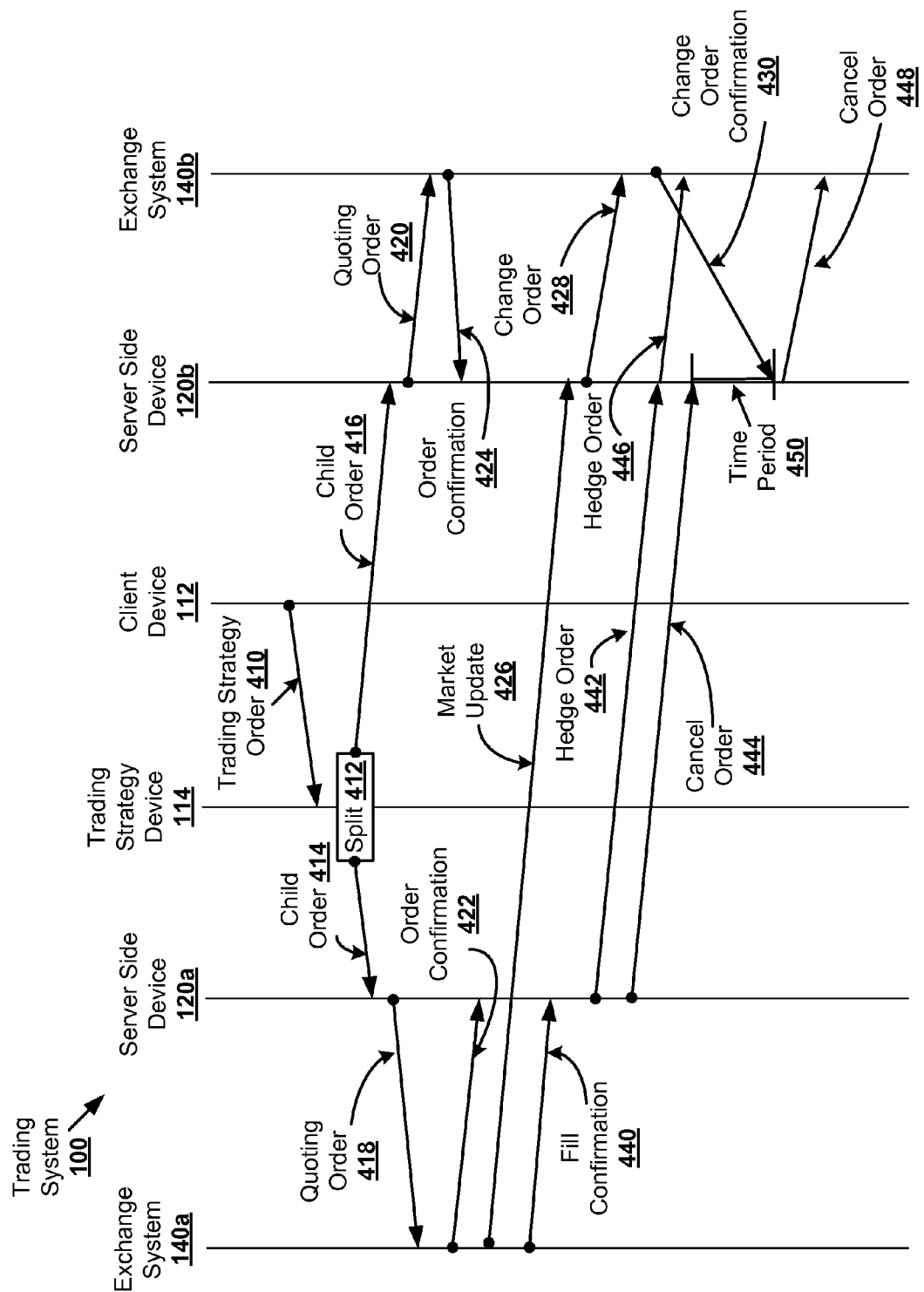

FIG. 4B illustrates a trading system 100 that is used for working a trading strategy order 410. The process of placing the trading strategy order 410 is similar to that shown in FIG. 4A, however, instead of market update 432 being sent to the server side device 120*b*, the exchange system 140*a* matches the quoting order 418 and sends a fill confirmation 440. However, in another example, the quoting order 418 may be matched before or at the same time as the market update 426. In response to filling the quoting order 418, the exchange system 140*a* sends a fill confirmation 440 to the server side device 120*a*, as shown in the example of FIG. 4, confirming that the quoting order 418 was matched. Alternatively, or additionally, the fill confirmation 432 may be sent to the client device 112, trading strategy device 114, server side device 120*b*, or a combination thereof.

In response to receiving the fill confirmation 432, the server side device 120*a* transmits a hedge order 444 and a cancel order 444 to the server side device 120*b*. The hedge order 442 places a trade order for the leg that leg A was leaning on. The hedge order 442 may be submitted prior to or after the cancel order 444. The cancel order 444 cancels the quoting order 420 for leg B. Although shown in FIG. 4B as separate messages, the hedge order 442 and cancel order 444 may be a single order message.

In some embodiments, for example, when the server side devices 120*a*, 120*b* are not in communication with each other, the hedge order 442 and cancel order 444 may be transmitted to the trading strategy device 114 for routing to the server side device 120*b*, for example. Alternatively, or additionally, the server side device 120*a* may transmit the hedge order 442 and cancel order 444 to the server side device 120*b*, for example, when the server side devices 120*a*, 120*b* are in communication with each other.

Once the hedge order 442 is received by the server side device 120*b*, the server side device 120*b* sends a hedge order 446 to the exchange system 140*b*. The hedge order may be placed at any time, for example, before the change order confirmation is received 430, before or after the cancel order 444, after the server side device 120*b* receives the change order confirmation 430, or any other time.

Prior to receiving the change order confirmation 430, the server side device 120*b* receives cancel order 444. However, at the time the cancel order 444 is received, the server side device 120*b* is unable to cancel the change order 428 because the server side device 120*b* has not received the change order confirmation 430 with the confirmation information; and thus, does not know which order to cancel. Accordingly, the server side device 120*b* is unable to perform the cancel operation until the change order confirmation 430 is received. As a result, the trader is open to risk during the time period 450, which includes the time between receiving the cancel order 444 and receiving the change order confirmation 430. However, as discussed below, this time period is much smaller than the instance where the change order confirmation 430 would have to be sent all the way back to the server side device 120*a* before sending the cancel order 448. Once the change order confirmation 430 is received, the server side device 120*b* submits a cancel order 448. The cancel order 448 cancels the change order 428. The hedge order 446 may be submitted during the time period 450 because the confirmation information is not needed.

As shown in FIG. 4B, splitting a trading strategy order and sending child orders to server side devices 120 at, near, or in one, some, or all of the exchange systems 130 may reduce the amount of time that a trader is at risk for being legged, double filled, or both legged and double filled. That is, the server side device 120*b* can submit the cancel order 434 as soon as it receives the change (or a Cancel/Replace if Change is not supported) order confirmation from the exchange system 140*b*. Since the server side device 120*b* and exchange system 140b are located closer to each other than the server side device 120a and the exchange system 140b, the waiting time (i.e., the time period 450) for the confirmation 430 is less than the waiting time (i.e., the time period 334) for the confirmation 324. Plus, the distance traveled by the change order confirmation 430 is less than the distance traveled by the change order confirmation 324. Furthermore, the distance traveled by the cancel order 448 is less than the distance traveled by the cancel order 338. With respect to time, a shorter distance may indicate less travel time, and thus, a greater advantage for the user.

Before and after the child orders are submitted to the exchange systems, the server side devices 120 may, for example, cancel orders, change orders, query an exchange, or any combination thereof. Cancelling orders may include cancelling all or some of an order that has been or is scheduled to be submitted to an exchange system. For example, in the event that an exchange system 140 is only able to fill a portion of a quoting order, the exchange system 140, instead of waiting until the entire order can be filled, will trade only the portion that is able to be filled and send a partial fill order to the server side device 120. In response, the server side device 120 may send a partial cancel order and a partial hedge order. This allows continuous or periodic filling until the entire trading strategy is completely filled.

Furthermore, changing an order may include, for example, changing order parameters, changing the formatting of an order (for example, changing to a protocol, such as the Financial Information Exchange (FIX) protocol), submission time of an order, changing a communication path for submission, or any combination thereof. Querying an exchange may include requesting information, such as market data, or other data.

The child trading strategies are the same as the parent trading strategy except for the number of legs marked as quoting legs. That is, filling either the first child order 414 or the second child order 416 is the same as filling the trading strategy order 410. For example, filling one of the child orders may produce the same or substantially the same result as filling the trading strategy order 410 from the client device 112. The term "substantially" takes into account minor variations in the electronic trading system 100, for example, changes in price that may occur by varying (for example, increasing or decreasing) the time for filling one or more orders. Prices fluctuate quickly. Accordingly, the price for filling the order from the client device 112 may be different than the price for filling a child order, for example, because the child order may be submitted in less time than the order from the client device 112. However, the same trading strategy is executed, even though the price may change, by filling the order from client device 112 or filling a combination of one, some, or all of the child orders 230, 240. It should be noted that having a server side device that is close to the exchange system increases the likelihood of filled on the quoting leg. Furthermore, the hedge order is more likely to arrive faster to the exchange system (compared with a single server side solution). Additionally, there is less likelihood of being double filled since the second quoting order is removed faster (the in-flight time is reduced to a minimum).

In the example of FIG. 4B, the exchange system 140a filled the first child order 414 before the exchange system 140b was able to fill the second child order 416. However, in other examples, the exchange system 140b may be able to fill the second child order 416 before the first child order 230 is filled. Accordingly, the process may be reversed such that the Q1 order 418 is cancelled and replaced.

IV. EXEMPLARY TRADING STRATEGY DEVICE

Figure 8:
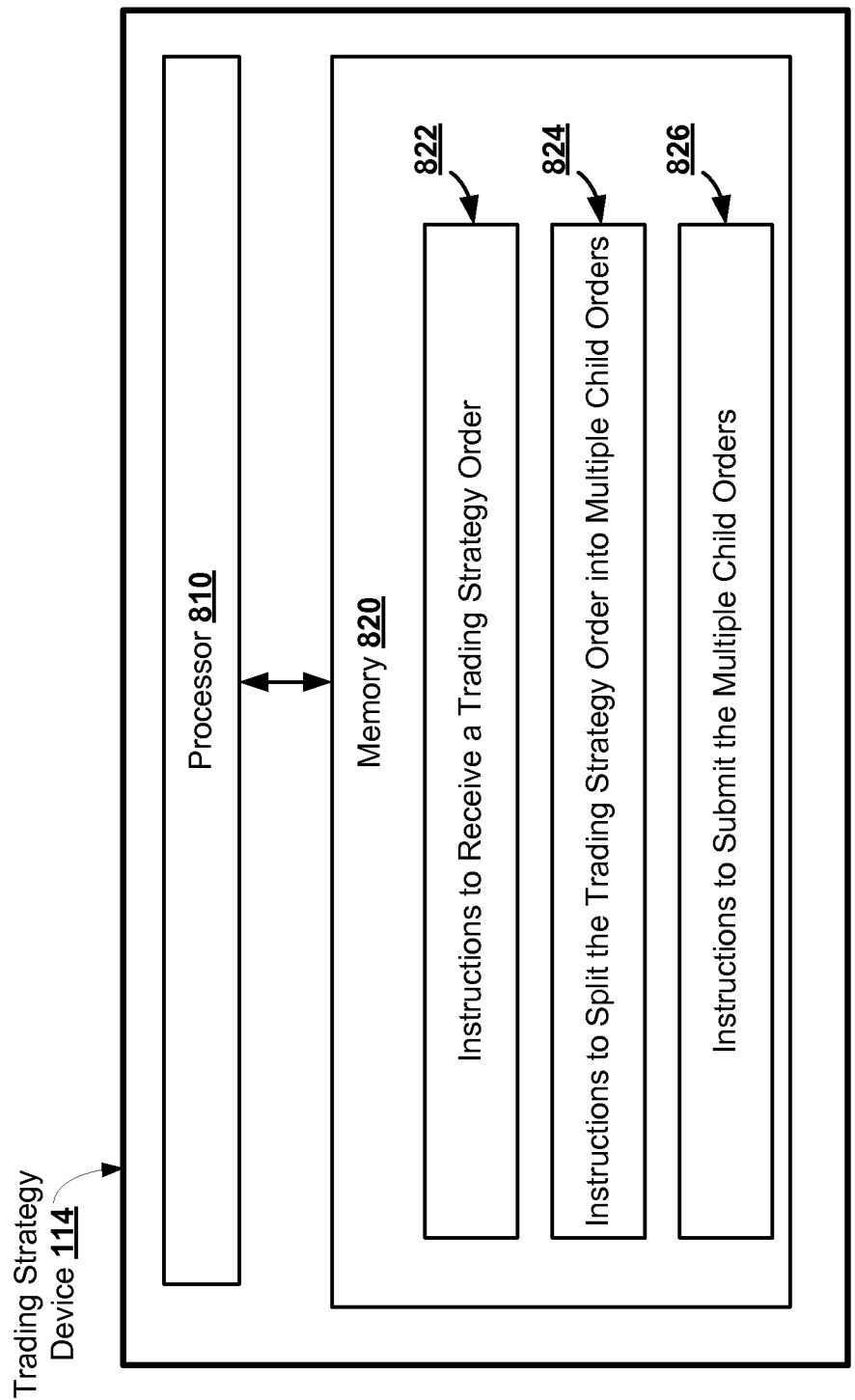
FIG. 8 illustrates an example of a trading strategy device.

FIG. 8 illustrates one example of a trading strategy device 114. The trading strategy device 114 includes one or more electronic computing platforms. For example, as shown in FIG. 8, the trading strategy device 114 may include an electronic computing platform having a processor 810 and a memory 820. The processor 810 may be communicatively coupled with the memory 820 and execute instructions stored on the memory 820. The trading strategy device 114 may include additional, different, or fewer components.

The processor 810 may be a general processor, digital signal processor, application specific integrated circuit, field programmable gate array, analog circuit, digital circuit, combinations thereof, or other now known or later developed processors. The processor 810 may be a single device or a combination of devices, such as associated with a network or distributed processing. Any of various processing strategies may be used, such as multi-processing, multi-tasking, parallel processing, or the like. Processing may be local, as opposed to remote. However, processing can be performed remotely. Processing may be moved from one processor to another processor. The processor 810 may be responsive to logic encoded in tangible media. The logic may be stored as part of software, hardware, integrated circuits, firmware, micro-code or the like.

The memory 820 may be computer readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 820 may be a single device or combinations of devices. The memory 820 may be adjacent to, part of, programmed with, networked with and/or remote from processor 810.

The processor 810 may be operable to execute logic encoded in one or more tangible media, such as memory 820. Logic encoded in one or more tangible media for execution may be instructions that are executable by the processor and that are provided on the computer-readable storage media, memories, or a combination thereof. The processor 810 is programmed with and executes the logic. The functions, acts or tasks illustrated in the figures or described herein may be executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one example, as shown in FIG. 8, the memory 820 may include instructions that may be executed to receive a trading strategy order 822 (hereinafter, "instructions 822"), instructions that may be executed to split the trading strategy order into multiple child orders 824 (hereinafter, "instructions 824"), and instructions that may be executed to submit the multiple child orders 826 (hereinafter, "instructions 826"). The memory 820 may include additional, different, or fewer instructions.

The instructions 822 may be executed to receive a trading strategy order for a trading strategy including multiple quoting legs, one or more non-quoting legs, or a combination thereof. For example, the trading strategy may have a first quoting leg and a second quoting leg. The instructions 824 may include instructions that may be executed to determine or identify that the trading strategy has multiple quoting legs. Furthermore, the instructions 824 may define child trading strategies and/or instructions that may generate multiple child orders. Each child order may include a single quoting leg or less quoting legs than the initial trading strategy order. The instructions 826 may include instructions that may be executed to submit the multiple child orders, for example, to two or more exchange systems. The exchange systems may be the same or different exchange systems. Submitting the multiple child orders may include transmitting the child orders to server side devices adapted to submit quoting orders for the quoting legs to exchange systems adapted to fill the quoting orders. The server side devices may be physically located at, near, or in the exchange systems. For example, the first child order may be matched and filled at a first exchange system and the second child order may be matched and filled at a second exchange system.

V. EXEMPLARY METHODS FOR ELECTRONIC TRADING

Figure 9:
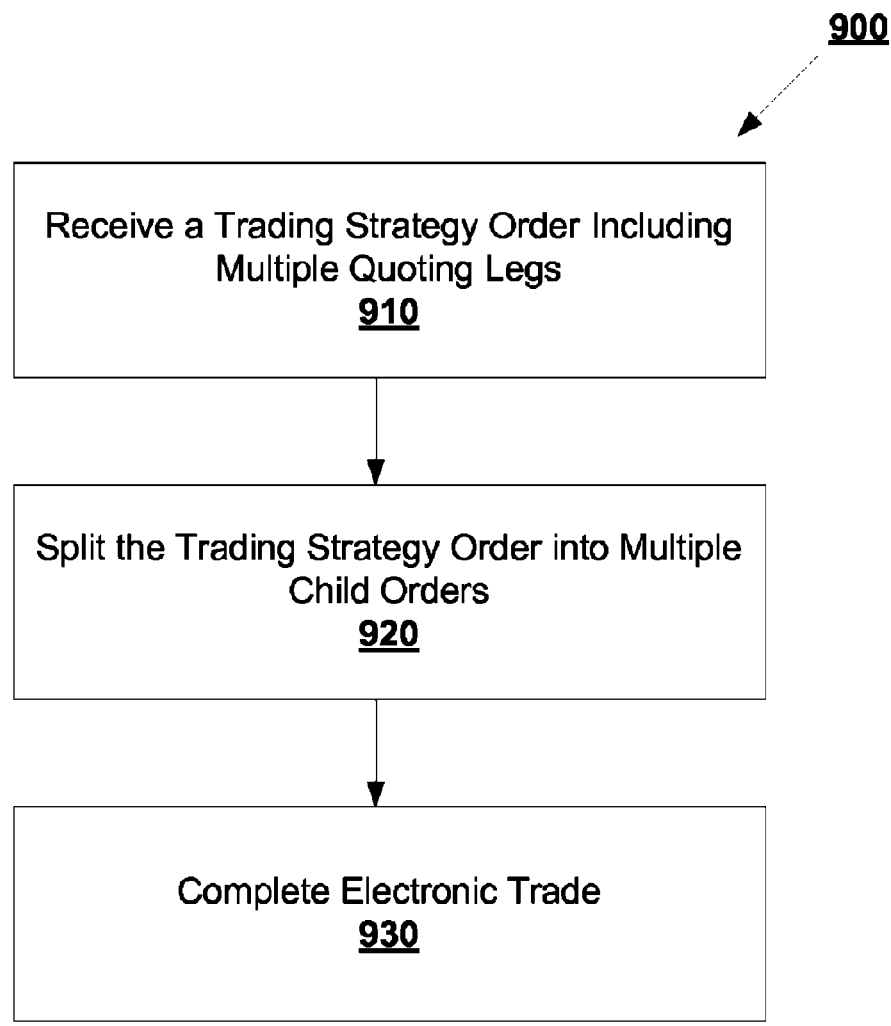
FIG. 9 illustrates a flowchart of an exemplary method for trading in an electronic trading environment.

FIG. 9 illustrates an exemplary method 900 for electronically trading a trading strategy order. The acts may be performed in the order shown or a different order. The method 900 includes receiving a trading strategy order having multiple quoting legs 910, splitting the trading strategy order into multiple child orders 920, and completing an electronic trade 930. Additional, different, or fewer acts may be performed in the method 900.

In act 910, a trading strategy device may receive a trading strategy order including a trading strategy including multiple quoting legs. Receiving may include requesting, pulling, intercepting, or otherwise obtaining In various embodiments, for example, prior to act 910, the method 900 may include generating a trading strategy order, for example, according to the trading strategy definition. A trading strategy definition may be received from the client device. For example, the trading strategy may be defined by a user using a client device. Defining the trading strategy may include defining one or more tradable objects. The tradable objects may be legs, such as quoting legs or non-quoting legs. The trading strategy definition may be automatically or manually input by a trader into the client device. In another example, all or some of the trading strategy definition may be received at the same or different times. For example, a trader may define a trading strategy (e.g., define a spread) and send the configuration data to the trading strategy device or the server side devices. Then, during a trading session, the price and quantity information may be defined, for instance, by selecting a price and quantity along a price axis.

Once generated, a client device may send the trading strategy order to the trading strategy device 114. The trading strategy order may be sent at the request from a user (for example, by clicking a "Send" button) or automatically. For example, a trader may utilize an electronic trading workstation to place the trading strategy order. As another example, an automated trading tool may calculate one or more parameters for an order and automatically send the order. In some instances, an automated trading tool may prepare the order to be sent but not actually send it without confirmation from the user.

In some embodiments, the client device designates the trading strategy device as the recipient of the trading strategy order, for example, using an address or communication path allocated to the trading strategy device. However, in other embodiments, the trading strategy order can be sent to another device that routes the trading strategy order to the trading strategy device.

As discussed above, the trading strategy order may be associated with a trading strategy having multiple quoting legs. That is, the trading strategy has multiple legs that are marked as quoting legs. The legs marked as quoting legs may be some or all of the legs in the trading strategy.

Figure 10:
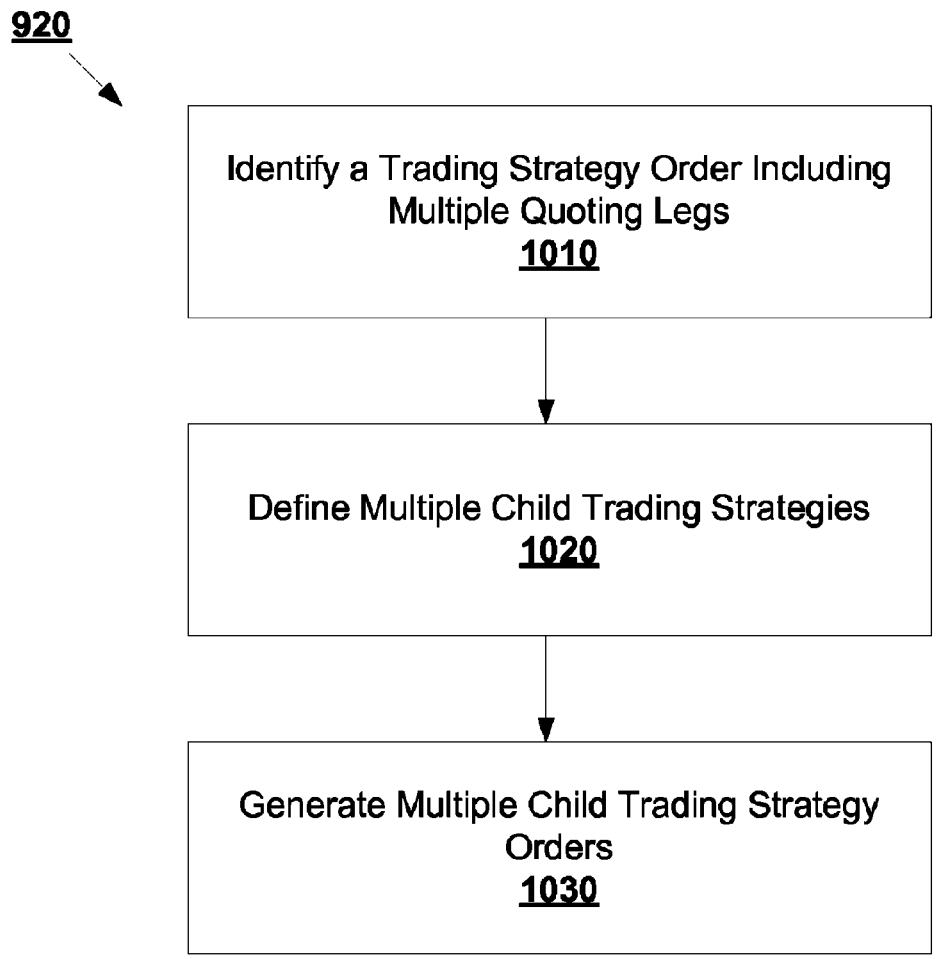
FIG. 10 illustrates a flowchart of an exemplary method for splitting an order for a trading strategy order.

In act 920, the trading strategy device splits the trading strategy order. FIG. 10 illustrates an example of act 920. As shown in FIG. 10, splitting includes identifying a trading strategy order associated with a trading strategy having multiple quoting legs 1010, defining child trading strategies 1020, and generating child orders for the child trading strategies 1030. Splitting is not limited to those acts described above. Splitting the trading strategy order may include additional, different, or fewer acts.

In act 1010, the trading strategy device identifies a trading strategy order associated with a trading strategy including multiple quoting legs. Identifying may include counting, recognizing, calculating, or otherwise determining the number of quoting legs in a trading strategy order and determining whether the number of quoting legs is two or more. For instance, the trading strategy device may analyze each leg in the trading strategy order, determine whether each leg is a quoting leg or a non-quoting leg, and count the number of legs that are marked as quoting legs. In another example, the client device, for example, when generating the trading strategy order, indicates the number of quoting legs in a field designated for indicating the number of quoting legs in trading strategy order. Accordingly, the trading strategy device may read and analyze that field.

In act 1020, the trading strategy device defines child trading strategies. For example, in response to identifying a trading strategy order associated with a trading strategy including multiple quoting legs, the trading strategy device defines multiple child trading strategies. The child trading strategies are the same as the trading strategy associated with the trading strategy order, except for the number of legs that are being quoted. That is, the number of legs marked as quoting legs in the child trading strategies is different than (e.g., less than) the number of legs marked as quoting legs in the trading strategy associated with the trading strategy order—even though the strategy (e.g., buying and selling tradable objects) is the same. For instance, the child trading strategies may include a single quoting leg or a reduced number of quoting legs (for example, relative to the number of quoting legs in the trading strategy order).

As discussed above, the number of child trading strategies that are defined depends, for example, on the number of quoting legs in the trading strategy order. Each child trading strategy may have a single quoting leg. However, in another example, multiple quoting legs may be included or grouped in a single child trading strategy. Quoting legs may be grouped based on the exchange system adapted to match the quoting legs. For example, quoting legs that are traded at the same exchange system may be included in the same child trading strategy. However, even when grouped together, the number of quoting legs in the child order is less than the number of quoting legs in the trading strategy order.

Each child trading strategy has zero, one, or more quoting legs. For example, the number of quoting legs in the child trading strategies is less than the number of quoting legs in the trading strategy of the initial order.

In act 1030, child trading strategy orders may be generated. Each child order may include one of the child trading strategies. Once one, some, or all the child trading strategies are defined, as shown in act 1020, the trading strategy device generates multiple child trading strategy orders. Each child order includes a child trading strategy including a single quoting leg or a reduced number of quoting legs. Any number (for example, two or more) of child orders may be generated, for example, depending on the complexity of the trading strategy in the trading strategy order. For instance, generating child trading strategies may include generating a child order for each quoted leg in the trading strategy associated with the trading strategy order. In another example, generating child trading strategies may include minimizing the number of child orders that need to be generated, for example, by grouping child trading strategies. The legs or trading strategies may be grouped, for example, based on latency, physical location of the server side devices or exchange systems or gateways, trader preference, exchange capabilities, other now known or later developed criteria, or any combination thereof.

When generating child trading orders, all, some, one, or none of the legs in the child orders are quoting legs. That is, a child order can have any number of non-quoting legs and/or quoting legs. The number of child orders may depend on, for example, the number of legs in the trading strategy, the number of quoting legs, latency, capabilities of the exchanges, or any combination thereof. The number of non-quoting legs and quoting legs in the child orders may be the same or different. The number of non-quoting legs and quoting legs may or may not vary between child orders. For example, in the child orders, quoting legs may be mixed with other quoting legs or non-quoting legs. However, a single non-quoting leg and quoting leg may, alternatively or additionally, stand alone. The trading strategy device determines the number of child orders, the number of non-quoting legs in each child order, the number of quoting legs in each child order, or a combination thereof based on, for example, latency in submitting the child orders. The trading strategy device may minimize the time for submitting the child orders.

Referring back to FIG. 9, in act 930, the trading strategy device may complete the trading transaction. Completing the trading transaction may include sending the child trading strategy orders to one or more server side devices. The trading strategy device may intelligently route the multiple child orders. For example, a child order can be sent to a server side device adapted to work the child order with an exchange system adapted to fill the quoting legs in the child orders. In the event that there are multiple server side devices adapted to work a child order, the trading strategy device may send the child order to a server side device located at a site nearest to the exchange system. For example, as shown, the child order may be sent to the server side device, which is located nearest to the exchange system, and the child order may be sent to the server side device, which is located nearest to the exchange system.

Furthermore, the trading strategy device may, for example, select a communication path for sending the child orders based on latency. Latency may include the time required for a receiving device, such as a server side device or exchange system, to receive a child order from the trading strategy device. The trading strategy device may reduce or minimize latency, for example, by submitting a child order via a communication path that has the least or a reduced amount of delay between the trading strategy device and the exchange systems. The communication path may connect the trading strategy device and the exchange systems. In one example, the communication path may include communication devices, such as communication nodes, routers, servers, etc., that may report delay back to the trading strategy device. The trading strategy device may analyze the information to determine the optimum (for example, with the least latency) communication path.

In some embodiments, the method 900 may include submitting quoting orders associated with a child order. A quoting order may be an order, for example, configured as required by an exchange system. Accordingly, a child order may be a quoting order or different than a quoting order. That is, a child order may be configured as required by an exchange system or not configured as required by the exchange system. A server side device submits quoting orders.

Furthermore, act 930 may include submitting hedge orders, receiving partial fill orders, submitting partial hedge orders, submitting a cancel order (for example, an order cancels order), or otherwise ensuring that the trading strategy is executed. Of course, other acts may be performed when working the quoting orders.

VI. EXEMPLARY ILLUSTRATION

The following illustration illustrates a few of the concepts and advantages of a distributed server side device environment. The following illustration only illustrates some of the various embodiments and should not be interpreted as disclosing all of the embodiments.

A trader, using a client device that is physically located in New York City, is spread trading crude oil traded on the Tokyo Commodity Exchange (TOCOM) and crude oil traded on the Chicago Mercantile Exchange (CME). In this illustration, the crude oil traded in Tokyo may be referenced as "COT" and the crude oil traded in Chicago may be referenced as "COC". The large distance between New York City and the exchange cities makes it especially advantageous to use a distributed server side environment, as will be illustrated below.

During a trading session, the trader uses a client device to submit a trade order for the spread (e.g., COT-COC). In this illustration, the spread has two legs. The first leg is associated with buying COT and the second leg is associated with COC. The trader may have indicated, for example, by checking one or more boxes on a trading screen, that both of the legs should be quoted. Accordingly, the spread has multiple quoting legs. In particular, the spread has two quoting legs. Once received, the trading strategy identifies that the spread has two quoting legs. In response, the trading strategy device sends a first child trading strategy order to a first server side device and a second child trading strategy order to a second server side device. The first and second server side devices are different server side devices.

The first and second child trading strategy orders are associated with the same trading strategy as the original trade order, except only the first leg is quoted in the first child trading strategy order and only the second leg is quoted in the second child trading strategy order.

In this illustration, the trading strategy device is physically located at or near the client device. Accordingly, since the first server side device is located at, in, or near the TOCOM and the second server side device is located at, in, or near the CME, the distance between the trading strategy device (NYC) and the first server side device (Tokyo) is approximately 6735 miles and the distance between the trading strategy device (NYC) and the second server side device (Chicago) is approximately 711 miles. Accordingly, data that is transferred from the trading strategy device to first server side device or vice versa takes approximately 220 milliseconds and data that is transferred from the trading strategy device to the second server side device or vice versa takes approximately 30 milliseconds.

Since the first server side device sits at, in, or near the TOCOM, the time for transferring data from the first server side device to the TOCOM is approximately 10 milliseconds. Likewise, since the second server side device sits at, in, or near the CME, the time for transferring data from the second server side device to the CME or vice-versa is also approximately 10 milliseconds. These numbers are only examples.

Before further explaining further, it should be noted again that each of the values (e.g., time and distance) in this illustration are for exemplary purposes only. One, some, or all of these values may, and likely will, change for a variety of reasons.

Once the first child trading strategy and second child trading strategy are defined, the trading strategy device sends the first child trading strategy order to the first server side device at, in, or near the TOCOM and the second child trading strategy order to the second server side device located at, in, or near the CME. The first server side device is adapted to work the first leg, which is the only leg quoted in the first child trading strategy order, and the second server side device is adapted to work the second leg, which is the only leg quoted in the second child trading strategy order.

As part of working the orders, the first server side device generates a first quoting order and submits the first quoting order to the TOCOM. The first server side device generates a second quoting order and submits the second quoting order to the CME.

One benefit of having distributed server side devices working quoting orders is that the data transfer between the server side devices and the exchanges is less than having a single server side device working multiple quoting orders at multiple exchanges. That is, if a single server side device at the TOCOM was working the first and second child trading strategy orders, the single server side device would have to wait approximately 250 (220+30) milliseconds for data from the CME. Compared to the approximately 10 milliseconds that the second server side device has to wait, the benefit is quite noticeable.

VII. CONCLUSION

The description includes a number of inventions. The various inventions are not limited in their application to the details of design and the arrangement of the components set forth in the summary or description or illustrated in the drawings. The inventions are capable of other embodiments or of being practiced or carried out in various ways. It will be understood that various changes may be made and equivalents may be substituted and/or many modifications may be made. It is intended that the inventions not be limited.

The invention claimed is:

1. A method comprising:
receiving, by a computing device, a trading strategy order having a plurality of quoting legs and at least one hedge leg;
determining, by the computing device, that the trading strategy order includes the plurality of quoting legs;
in response to determining that the trading strategy order includes the plurality of quoting legs, generating, by the computing device, a plurality of child orders, each child order of the plurality of child orders including at least one child quoting leg and at least one child hedge leg, where each child order includes a number of child quoting legs less than a number of the plurality of quoting legs of the trading strategy order, and where a number of the plurality of child orders and the number of child quoting legs for each child order are determined based on any one of latency, physical location of a server side device, physical location of an exchange system, trader preference, and exchange capabilities; and
submitting, by the computing device, the plurality of child orders for matching.

2. The method of claim 1, wherein the plurality of child orders include a first child order and a second child order, the first child order being submitted to a first exchange system for matching and the second child order being submitted to a second exchange system for matching, wherein the first exchange system is different than the second exchange system.

3. The method of claim 2, wherein the first child order and the second child order each comprise one quoting leg.

4. The method of claim 2, further comprising matching the trading strategy order including matching either the first child order or the second child order.

5. The method of claim 2, wherein submitting the plurality of child orders for matching includes transmitting the first child order to a first server side device physically located at, near, or in the first exchange system and transmitting the second child order to a second server side device physically located at, near, or in the second exchange system, wherein the first server side device is different than the second server side device.

6. The method of claim 5, wherein the first server side device works the first child order at the first exchange system and the second server side device works the second child orders at the second exchange system.

7. A non-transitory computer readable medium having stored therein instructions executable by a processor, wherein the instructions are executable to:
receive a trading strategy order having a plurality of quoting legs and at least one hedge leg;
determine that the trading strategy order includes the plurality of quoting legs;
generate a plurality of child orders when the trading strategy order includes a plurality of quoting legs, wherein each child order of the plurality of child orders includes at least one child quoting leg and at least one child hedge leg, where each child order includes a number of child quoting legs less than a number of the plurality of quoting legs of the trading strategy order, and where a number of the plurality of child orders and the number of child quoting legs for each child order are determined based on any one of latency, physical location of a server side device, physical location of an exchange system, trader preference, and exchange capabilities; and
submit the plurality of child orders for matching.

8. The non-transitory computer readable medium of claim 7, wherein the plurality of child orders include a first child order and a second child order, the first child order being submitted to a first exchange system for matching and the second child order being submitted to a second exchange system for matching, wherein the first exchange system is different than the second exchange system.

9. The non-transitory computer readable medium of claim 8, wherein the instructions executable to generate the plurality of child orders includes instructions executable to generate the first child order and the second child order with one quoting leg each.

10. The non-transitory computer readable medium of claim 8, wherein the instructions are further executable to match the trading strategy order including matching either the first child order or the second child order.

11. The non-transitory computer readable medium of claim 7, wherein the instructions executable to submit the plurality of child orders for matching includes instructions executable to transmit the first child order to a first server side device physically located at, near, or in the first exchange system and transmit the second child order to a second server side device physically located at, near, or in the second exchange system, wherein the first server side device is different than the second server side device.

12. The non-transitory computer readable medium of claim 11, wherein the first server side device works the first child order at the first exchange system and the second server side device works the second child orders at the second exchange system.

13. A method comprising:
receiving, by a trading strategy device, a parent trading strategy including a plurality of quoting legs and at least one hedge leg;
splitting, by the trading strategy device, the parent trading strategy order into a plurality of child orders, wherein each child order of the plurality of child orders includes a child trading strategy having a child quoting leg and at least one child hedge leg, each child trading strategy of the plurality of child trading strategies having a different number of legs marked as child quoting legs than a number of parent quoting legs of the parent trading strategy, and where a number of the plurality of child orders and the number of child quoting legs for each child order are determined based on any one of latency, physical location of a server side device, physical location of an exchange system, trader preference, and exchange capabilities; and
submitting, by the trading strategy device, each of the plurality of child orders to one or more exchange systems adapted to fill the child quoting legs in the child orders.

14. The method of claim 13, wherein splitting includes determining whether the parent trading strategy order includes the plurality of quoting legs.

15. The method of claim 14, wherein splitting includes defining child trading strategies and generating the plurality of child orders, wherein the child orders are for one or more of the child trading strategies.

16. The method of claim 13, wherein the one or more exchange systems include a first exchange system and a second exchange system.

17. The method of claim 13, wherein splitting the parent trading strategy occurs prior to the parent trading strategy being transmitted to a first exchange system in the one or more exchange systems.

* * * * *